(12) United States Patent
Timoney

(10) Patent No.: US 12,115,822 B2
(45) Date of Patent: Oct. 15, 2024

(54) MOTOR VEHICLE SUSPENSION GAS SPRING

(71) Applicant: Timoney Dynamic Solutions Limited, Navan (IE)

(72) Inventor: Eanna Pronsias Timoney, Inistioge (IE)

(73) Assignee: Timoney Dynamic Solutions Limited, Navan (IE)

( * ) Notice: Subject to any disclaimer, the term of this patent is extended or adjusted under 35 U.S.C. 154(b) by 0 days.

(21) Appl. No.: 17/797,745

(22) PCT Filed: Feb. 8, 2021

(86) PCT No.: PCT/EP2021/052975
§ 371 (c)(1),
(2) Date: Aug. 5, 2022

(87) PCT Pub. No.: WO2021/156510
PCT Pub. Date: Aug. 12, 2021

(65) Prior Publication Data
US 2023/0080108 A1   Mar. 16, 2023

(30) Foreign Application Priority Data

Feb. 7, 2020  (IE) ..................................... 2020/0021
Feb. 7, 2020  (IE) ..................................... 2020/0022
(Continued)

(51) Int. Cl.
*B60G 15/12*   (2006.01)
*B60G 17/08*   (2006.01)

(52) U.S. Cl.
CPC ............. *B60G 15/12* (2013.01); *B60G 17/08* (2013.01); *B60G 2202/322* (2013.01);
(Continued)

(58) Field of Classification Search
CPC .. B60G 15/12; B60G 17/08; B60G 2202/322; B60G 2204/62; B60G 2206/41; B60G 2500/11; B60G 2600/182
See application file for complete search history.

(56) References Cited

U.S. PATENT DOCUMENTS 4,697,797 A   10/1987   Gold
4,742,996 A    5/1988   Gold
(Continued)

FOREIGN PATENT DOCUMENTS

CA    2981094 C  *  7/2020   ............... B60G 9/00
CN   101443204 A  *  5/2009   ......... B60G 17/0162
(Continued)

OTHER PUBLICATIONS

International Search Report prepared by the European Patent Office under Application No. PCT/EP2021/052975, mailed Sep. 30, 2021, 7 pages.
(Continued)

*Primary Examiner* — Faye M Fleming
(74) *Attorney, Agent, or Firm* — Michael Crilly, Esquire

(57) ABSTRACT

A high-pressure gas spring for vehicle suspension systems includes an integral gas damping system and an integral counter spring to reduce spring residual force at suspension rebound. The gas spring includes an inverted piston feature that reduces the overall length of the device. Additionally, there are other innovative features incorporated in the gas spring to improve performance, reduce cost and minimise weight.

18 Claims, 11 Drawing Sheets

(30) Foreign Application Priority Data

Feb. 7, 2020 (IE) .................................... 2020/0023
Feb. 7, 2020 (IE) .................................... 2020/0024

(52) U.S. Cl.
CPC ...... *B60G 2204/62* (2013.01); *B60G 2206/41* (2013.01); *B60G 2206/7105* (2013.01); *B60G 2500/104* (2013.01); *B60G 2500/11* (2013.01); *B60G 2600/182* (2013.01); *B60G 2800/162* (2013.01)

(56) References Cited

U.S. PATENT DOCUMENTS

| | | | |
|---|---|---|---|
| 4,899,853 | A | 2/1990 | Hummel |
| 4,934,667 | A | 6/1990 | Pees et al. |
| 4,972,928 | A | 11/1990 | Sirven |
| 6,382,373 | B1 | 5/2002 | Lemmens et al. |
| 6,782,979 | B1 | 8/2004 | Gold et al. |
| 7,802,776 | B2 | 9/2010 | Behmenburg et al. |
| 7,886,882 | B2 | 2/2011 | Behmenburg et al. |
| 8,511,652 | B2 | 8/2013 | Moulik et al. |
| 8,540,222 | B2 | 9/2013 | Westnedge et al. |
| 8,640,835 | B2 | 2/2014 | Holman et al. |
| 9,139,061 | B2 | 9/2015 | Delorenzis |
| 2001/0042663 | A1 | 11/2001 | Marking et al. |
| 2003/0173723 | A1 | 9/2003 | Behmenburg et al. |
| 2004/0124571 | A1 | 7/2004 | Gold et al. |
| 2004/0201146 | A1 | 10/2004 | Behmenburg et al. |
| 2008/0093782 | A1 | 4/2008 | Behmenburg et al. |
| 2009/0140475 | A1 | 6/2009 | Turner |
| 2009/0260902 | A1 | 10/2009 | Holman et al. |
| 2010/0116608 | A1 | 5/2010 | Runkel |
| 2010/0219569 | A1 | 9/2010 | Mori |
| 2010/0244340 | A1 | 9/2010 | Wooten et al. |
| 2011/0215551 | A1 | 9/2011 | Galasso et al. |
| 2012/0061887 | A1 | 3/2012 | Westnedge et al. |
| 2012/0193849 | A1 | 8/2012 | Runkel |
| 2014/0070468 | A1 | 3/2014 | Leonard |
| 2015/0284048 | A1 | 10/2015 | Barefoot |
| 2016/0280033 | A1 | 9/2016 | Fulton et al. |

FOREIGN PATENT DOCUMENTS

| | | | | |
|---|---|---|---|---|
| CN | 104908875 | A | * 9/2015 | ......... B60G 17/0164 |
| CN | 206770497 | U | * 12/2017 | |
| DE | 19737293 | A1 | 3/1999 | |
| EP | 1464865 | A2 | 10/2004 | |
| EP | 1947360 | A1 | 7/2008 | |
| EP | 2364904 | A2 | 9/2011 | |
| EP | 3912845 | A1 | * 11/2021 | ................ B60L 5/08 |
| FR | 2927036 | A1 | * 8/2009 | ........... B60G 17/005 |
| GB | 791850 | | 3/1958 | |
| GB | 1502971 | | 3/1978 | |

OTHER PUBLICATIONS

Written Opinion of the International Searching Authority prepared by the European Patent Office under Application No. PCT/EP2021/052975, mailed Sep. 30, 2021, 15 pages.

\* cited by examiner

MOTOR VEHICLE SUSPENSION GAS SPRING

CROSS REFERENCE TO RELATED APPLICATIONS

This application is a national phase to PCT Application No. PCT/EP2021/052975 filed Feb. 8, 2021 which in turn claims priority to Irish Application Nos. 2020/0024, 2020/0023, 2020/0022, and 2020/0021 each filed Feb. 7, 2020, wherein all said applications incorporated in their entirety herein by reference thereto.

US GOVERNMENT SPONSORED RESEARCH AND DEVELOPMENT

None.

BACKGROUND OF THE INVENTION

1. Field

This invention relates to motor vehicle suspension systems, and in particular to a gas spring therefor.

2. Background

The use of gas springs in suspension systems for motor vehicles is well known. Most commonly such springs use either air or an inert gas such as nitrogen as the compressible medium. Typically, air springs comprise a bellows type construction to contain the air under pressure and are therefore limited by the strength of the bellows to maximum pressures in the region of 8/10 bar (120/145 psi). Such levels of air pressure require large diameter air bags to support the loads experienced in automotive suspensions. This large diameter causes great installation difficulties in the case of independent suspension systems where the suspension geometry limits the physical space required to accommodate the large diameter spring. In addition, the angulation of the suspension arms in moving from bump to rebound causes difficulties for the air bag which does not have a significant angulation capability. These difficulties are much more pronounced in high articulation, high load heavy duty independent suspension systems because of the higher angulation of the suspension arms and the necessarily larger airbag diameter required to carry the load. Additionally, particularly in double wishbone suspensions, the larger airbag diameter frequently necessitates mounting the airbag further inboard on the suspension arm thus increasing the wheel to spring force ratio and so increasing the spring force required for a given wheel load and so requiring a larger spring airbag diameter.

In high pressure gas springs, the diameter of the spring is greatly reduced but pressures in excess of 300 bar are sometimes required to support the suspension loads. Commonly hydraulic damping is incorporated inside such spring units and an inert gas, typically nitrogen, is required to avoid the risk of explosion in the event of leakage of oil into the high-pressure gas. This necessity to use an inert gas is an inconvenience and an extra cost of the suspension.

A further difficulty with gas springs, both high pressure nitrogen and low-pressure air bags, is that because of the polytropic nature of the compression curve the spring retains a positive force at full extension, corresponding to full rebound of the wheel. This is in contrast to a mechanical spring which has zero force at full extension. Having a positive force at full extension is an undesirable feature for a vehicle suspension as it results in greater roll angles under lateral acceleration since the unladen wheel has a residual force adding to the roll tendency of the vehicle. This increases the instability of the vehicle under conditions of lateral acceleration such as severe cornering or obstacle avoidance.

The present invention eliminates these undesirable characteristics of a gas sprung suspension and conveys many other advantages that will be described below in greater detail.

DESCRIPTION OF THE PRIOR ART

Gas Springs Patent Teaching

The use of high-pressure gas as a spring medium in suspension systems is well known. Typical gas pressures are in the region of 80 to 150 bar at static ride rising in some cases to a level of more than 300 bar at suspension bump. Various typical systems are described in U.S. Pat. No. 4,899,853, US2010 0116608A1, US20120193849A1, US2009 0260902A1, U.S. Pat. No. 8,640,835B2. A common feature of all these suspension struts is the use of a hydraulic medium to provide the damping forces. At such pressures if a gas medium such as air is used there is a risk of spontaneous combustion if the gas and hydraulic fluids were to mix. Hence an inert gas such as Nitrogen is commonly used in these suspension struts.

The use of air as the suspension medium in gas springs is also commonly known but in these cases the pressures are generally limited to about 8 bar resulting in diameters up to 550 mm for many applications such as trucks buses and coaches. Somewhat smaller diameters can be used for automobile air springs.

These types of air spring generally use some form of flexible diaphragm to contain the compressed air. Such springs are variously described as bellows type, convoluted bellows air springs, reversible sleeve air springs, rolling diaphragm air springs etc.

This form of structure limits the maximum usable pressure to values of the order of 80 bar. Generally, such air bag springs are used in conjunction with an external hydraulic damper. In some automotive cases the hydraulic damper is incorporated within the airspring.

Internal Air Damping Patent Teaching

The use of air as the damping medium in low pressure membrane type airsprings is known in the art. Frequently the damping mechanism is some type of orifice restrictor positioned between separate air chambers in the spring assemblies. Various versions of such springs are described in Leonard (US2014/0070468A1), who describes twin flexible membrane air chambers with differing spring rates, one of which is at least double the other and an interconnecting damper restrictor in addition to a separate damper within the spring which may be hydraulic or air. Westnedge (U.S. Pat. No. 8,540,222B2, US 2012/0061887A1), teaches a piston chamber which is operatively connected to a bellows chamber by means of an opening. The area of the opening and the volumes of the two chambers are tuned to optimise the damping of the air spring. Specifically, the ratio of the area of the opening to the volumes of the chambers is between 1:600:1200 to about 1:14100:23500. The opening area is from 0.039 to 0.13 square inches, the piston volume is between 150 and about 550 cubic inches and the bellows chamber volume is between 305 and 915 cubic inches. Fulton (US 2016/0280033A1) refers to the above prior art and states that it may potentially provide less than optimal damping at frequencies above about 5 Hz. Typically, suspensions are required to damp vibrations of the vehicle body at natural frequencies in the range 1 to 2 Hz and wheel hop frequencies in the range of about 12 to 15 Hz. In Fulton the airspring air damper is tuned to the body frequency of 1.8 Hz and a conventional hydraulic damper in parallel is tuned to the wheel hop frequency of 13 Hz. According to Fulton the earlier air damper described by Westnedge (U.S. Pat. No. 8,540,222B2), does not provide adequate damping at both frequencies. Pees (U.S. Pat. No. 4,934,667) describes an air damped spring with jounce and rebound bumpers of a microcellular foam material. Examination of the spring hysteresis curves indicate that these bumpers provide a very significant proportion, if not most, of the spring damper forces of the air spring damper assembly. The air spring claims a high-pressure capability of 6 to 12.4 bar compared to a more normal 3 to 7 bar. Behmenburg teaches in a number of patents (U.S. Pat. No. 7,886,882 B2; US 2008/0093782A1; U.S. Pat. No. 7,802,776B2; US 2004/0201146 A1; US 2003/0173723 A1) various air springs featuring two bellows type air chambers variously connected by means of orifices to achieve damping of the spring. In U.S. Pat. No. 7,886,882 B2, which describes a damper arrangement suitable for an air spring, he teaches damper restrictors tuned to frequencies of 1 to 1.5 Hz and to frequencies from 10 to 40 Hz to match the wheel hop and body frequencies respectively. Likewise, Gold (U.S. Pat. Nos. 4,742,996; 4,697,797; US 2004/0124571A1; U.S. Pat. No. 6,782,979 B1) describes a variety of pneumatic spring damping struts utilizing various configurations of rolling bellows type air chambers with damping valves in the pistons. Various different orifice configurations are described. Moulik (U.S. Pat. No. 8,511,652 B2) teaches that increased air pressure results in higher damping forces. He achieves a higher bellows chamber pressure, increasing the inner chamber pressure to 24 bar compared to 8 bar in the outer chamber, by having one bellows chamber inside another. Other patents relevant to the art are Pelz Air Damper EP1464865A2 and Pelz Air Damper EP1947360A1 which teach a pneumatic spring damper unit characterized in that a secondary space is separated from the damper space by a plate provided with throttle bores and/or throttle valves.

Air Damping External Reservoir

It is well known in the art that it is possible to reduce the spring rate of a gas spring thereby improving vehicle ride quality by increasing the volume of pressurised gas operatively associated with the gas spring. This may be achieved by having a relatively large internal volume as in various patents already mentioned above or by having an external reservoir fluidly interconnected to the air spring bellows chamber or chambers. There is much prior art with regard to air spring air damping mechanisms in which an air spring second chamber or reservoir is positioned remotely from the air spring bellows to which it is connected by a pipe, frequently with a damping orifice within said pipe. Such remote reservoirs are not commonly used in automotive applications, because of space claim demands and weight penalty. However, Delorenzis (U.S. Pat. No. 9,139,061 B2) does teach an innovative external reservoir concept for automotive suspensions wherein the reservoir is internal to an axle of the suspension system. The reservoir is fluidly connected to the airspring by means of a flow control device which permits flow from the air reservoir to the air spring when the pressure differential across the device reaches a pre-determined level.

However, the use of an external reservoir in an air suspension system is primarily used in the secondary suspension of railway car suspension systems and in the vibration isolation of precision apparatus.

Current Teaching of the Art

The analysis of air damping mechanisms is extremely complex and there is not unanimity among the technical community involved in studies of the art as to the exact performance mechanisms involved. There is a school which maintains that the size and nature of the restrictor (whether orifice type or pipe) has no influence on the magnitude of the damping force but affects only the frequency response of the damper—larger orifices having a higher frequency response than smaller orifices—Fongue, Pelz, Huayan, Quaglia, Bachrach. These analyses show that the restrictor dimensions affect only the frequency at which maximum damping occurs and that the maximum loss factor depends only on the ratio of the auxiliary chamber volume to the spring chamber volume, large diameter in relation to spring travel being considered an essential requirement for effective damping.

Another school of thought—Asami, Holtz, Lee, Toyofuku, Docquier, Saayyadi—come to some different, opposing conclusions, finding that the configuration of the restrictor, for example a pipe, has a significant influence on the frequency response displaying two frequency responses—possibly due to a Helmholtz resonance response. Nonetheless these practitioners also agree that a large diameter/stroke ratio is a prerequisite for effective damping.

Pelz states that "for natural frequencies to be damped which are greater than or equal to 1 Hz the inner friction in the valve cannot affect the damping process at all. So it is confusing rather than helpful for the understanding of the flow processes to talk about laminar and turbulent flow in throttles as is often done in the context of pneumatic damping." "The viscosity does not directly affect the damping process." The Pelz/Fongue theory is that at frequencies lower than the resonant frequency the pressure is the same in both chambers, piston movement has no effect on the orifice and system acts as a soft spring with no damping. At frequencies higher than the resonant frequency the air has no time to achieve pressure balance between the chambers, the restrictor has no effect and the two volumes act with high stiffness. Only in the range of the resonant frequency does damping occur and the orifice has no influence on the magnitude of the damping but only on the frequency response.

There is wide agreement that a large ratio of clearance/reservoir volume to piston chamber volume is a requirement for effective damping forces. Huayan refers to a ratio of 6:1, Quaglia 3:1, Bachrach 3:1, Asami 4.3:1, Erin 5.7:1, Lee 1.9:1, Docquier 2.25:1.

Neither of these schools of thought in teaching of the current art addresses the theory of high-pressure large displacement air spring air damping. There may be a number of reasons for this. The physics of air damping is extremely complex and present modelling techniques and mathematical analyses use simplified methods which confine the analysis to extremely small piston movements and incompressible flow theory. Such analyses and models are adequate to represent the behaviour of low-pressure flexible membrane air springs and as such have been a satisfactory tool for such studies. They do not accurately address the effects of large piston movement in relation to spring chamber diameter, very high gas pressures, and compressibility effects experienced in this invention. Large diameter airbag springs have been found to be very satisfactory in suspension systems on trucks, buses and commercial vehicles using beam axles in which the airbag diameter does not present comparable problems as experienced in independent suspension systems. Hence there has not been, in the past, a pressure to develop alternatives. They do however present installation problems on modern high performance independent suspension systems, especially for heavy vehicles, as will be further explained below.

Another possible reason for not advancing the art taught in the present invention is that current theory and experiment in air spring technology has been exclusively concentrated on large diameter flexible air bags of various kinds. A large air chamber to piston diameter ratio has been reported as having influence in increasing the damping force as has a large chamber to piston travel ratio, thus dismissing the concept of small ratio designs such as the present invention.

Yet another perception found in the current art is that the onset of choked flow in a damping device limits the energy dissipation capacity of the said restrictor. However, this thinking neglects the fact that though choked flow does limit the maximum velocity in the restrictor it does not limit the mass flow, which can continue to increase if the upstream pressure on the restrictor is increased. Since the energy dissipation is a function of the mass flow increased mass flow under choked flow conditions will result in increased energy dissipation.

Furthermore, the present art assumes air flow in the incompressible, laminar regime and neglects the effects of shock waves and turbulent flow in creating increased energy dissipation resulting in higher damping forces.

Various other dampers and shock absorbers are described in the prior art. US 2009/140475 discloses a hydraulic suspension damper with a pressure regulated control valve. The damper includes a floating piston slidably mounted within a cylinder to separate pressurised gas and hydraulic oil in the cylinder. U.S. Pat. No. 4,972,928 discloses a hydraulic damper, US 2001/042663 discloses another floating piston type shock absorber, GB1502971 discloses a pneumatic shock absorber, GB 791850 discloses a dynamic vibration damper and US 2010/244340 relates to a vehicle damper system.

SUMMARY OF THE INVENTION

Current automotive suspension air springs are universally of the flexible bellows type wherein the pressurised air containment chambers comprise flexible walls typically of a rubber fabric construction. Because of the structural limitations of the bellows, the maximum pressure is limited to about 80 bar. Thus, a relatively large diameter is required—compared, for example, to an equivalent coil spring. This feature becomes particularly significant in commercial vehicle and bus suspensions. With non-independent beam axle type suspensions, the constraints imposed by a large diameter are not as severe as with independent suspension types. Generally, in independent suspensions control arms are pivotally connected to the chassis and are subjected to greater angular movement than a beam axle. Also, because of the relative shortness of the suspension control arms, there are greater space constraints than with a non-independent suspension type. A high-pressure air spring can be of a much smaller diameter than either an airbag type or a conventional coil spring of the same capacity.

In high-performance off-road vehicles—such as military transport and armoured vehicles—a large suspension travel capacity is required. In independent suspension systems for such vehicles the use of conventional large diameter air springs is very difficult and, in most cases, impossible. Because of the limited travel of the air bag spring, it is frequently necessary to mount the spring inboard on the suspension arm thereby creating a force ratio between the wheel force and the required spring force. Thus, a larger capacity and so larger diameter spring is required. A small diameter high pressure air spring overcomes this problem.

Another advantage of a high-pressure air spring compared to a bellows type air spring is that a greater spring travel is easily achieved without compromising the stability or performance of the spring. A fourth advantage of the present invention is a significant weight saving compared to an equivalent capacity coil spring. Weight is a very important parameter for commercial vehicles and for suspension performance.

Yet a further advantage of the present invention compared to conventional air bag springs is a greater resistance to damage from stones etc., especially in severe off-road applications.

A gas spring of the type described in this invention comprises a piston which slides in a closed cylinder. The piston is actuated by a piston rod attached to the piston at one end and having a bearing at the other end which is attached either to the vehicle body or chassis frame or alternatively to an element of the suspension system. Similarly, the closed end of the cylinder is attached either to the vehicle or to an element of the suspension system.

The piston moves from a bottom point of least compression towards the closed end of the cylinder (the cylinder head) to a top point of maximum compression. The distance which the piston travels from the point of minimum compression to the point of maximum compression is known as the piston stroke. When the piston is at maximum compression there remains a certain volume between the piston and the cylinder head. This volume is commonly described as the clearance volume. In accordance with the physical law for the polytropic compression of a gas as experienced in the gas spring if the clearance volume were reduced to zero the pressure and force on the piston would become infinitely large. Thus, a clearance volume is a practical and necessary requirement for a gas spring of this type.

The volume displaced by the piston as it moves from maximum expansion to maximum compression is described as the swept volume, in other words the volume displaced by the piston stroke.

It is a feature of the polytropic compression of a gas that, for a given piston stroke, the maximum pressure is increased when the clearance volume is reduced and the minimum pressure at the maximum expansion is also increased.

This effect is graphically illustrated in FIG. 5 which shows two typical polytropic compression curves. Note that these curves are purely illustrative of the principles described herein. It can be seen that the curve with the smaller clearance volume Vc has a higher maximum pressure A than the curve in which the clearance volume is 2×Vc, with corresponding pressure B. Also, the curve Vc has a lower minimum pressure than the curve clearance 2×Vc=Vs as shown at point 'B'.

In a vehicle suspension system, it is generally desirable to have a stiffening spring rate as in A as the spring approaches maximum compression. This eliminates or reduces the necessity for a mechanical bump stop at maximum suspension bump or jounce. On the other hand, it is desirable to have as low as possible minimum pressure or force at suspension rebound. For example, a mechanical spring may have zero force. However, an undesirable characteristic of gas springs is that a residual pressure remains in the spring at full extension. This pressure may be minimized but at the cost of much higher maximum pressure which may exceed the structural capabilities of the strut or the suspension components. An ideal suspension curve would have a generally "S" shaped form—rising relatively steeply from zero to a point before the neutral ride point, flattening to give a soft spring rate around the neutral point and then stiffening again to give a suitably high force at maximum compression. The purpose of this invention is to provide a suspension curve approaching this ideal, as shown in FIG. 10.

In high pressure gas springs with internally integrated hydraulic damping, it is necessary to use an inert gas such as Nitrogen to eliminate the possibility of explosion in the event of leakage between the gas and hydraulic chambers of the spring. The use of Nitrogen is obviously more inconvenient than the use of air which is cheap and universally available.

Another disadvantage of current high pressure gas springs with internally integrated hydraulic damping is that in the event of the damper needing servicing the complete unit must be removed and brought to a suitably equipped clean room for servicing.

Another disadvantage of current high-pressure hydro pneumatic springs is that the various components are customized and so are very expensive unless in very large quantities which are very rare.

In the present invention the difficulties presented by an internally integrated hydraulic damper gas spring are eliminated by the use of an externally integrated hydraulic damper. This allows the use of air as the spring medium eliminating the disadvantages associated with the necessity to using an inert gas.

The present invention comprises a high pressure airspring with an integrated external hydraulic damping mechanism which overcomes many of the problems and shortcomings of conventional low pressure air bag airsprings and those of high-pressure hydro pneumatic gas springs. Other features, objects and advantages of the invention will be apparent to those skilled in the art from the following descriptions of preferred embodiments as will be more clearly understood by detailed reference to the appended drawings.

The present invention comprises a high-pressure air spring with either an integrated internal air damping mechanism, or alternatively an externally integrated hydraulic damper, which overcomes many of the problems and shortcomings of conventional low pressure air bag air springs and those of high-pressure hydro pneumatic gas springs Means to modify the spring characteristics to suit particular design requirements can be incorporated into the invention as will be further described below. In addition, means may also be incorporated to provide dual spring rates to cater for extreme changes in loading as in large construction dump trucks for example. Other features, objects and advantages of the invention will be apparent to those skilled in the art from the following descriptions of preferred embodiments as will be more clearly understood by detailed reference to the appended drawings.

In heavy load carrying vehicles, the load variation on the suspension—especially the rear suspension—can be very significant—the laden being as much as three times the unladen weight. This causes difficulties with the unladen ride of the vehicle, causing undesirable levels of whole-body vibration at the location of the driver and passengers.

This invention describes a gas spring which provides a solution to this problem.

According to the invention, there is provided a vehicle suspension gas spring for mounting between a vehicle chassis and a vehicle wheel suspension member, including: a cylinder closed at one end; a piston assembly slidably mounted within the cylinder and sealingly engaging with a bore of the cylinder to form a gastight seal between the piston and the cylinder bore; a piston rod attached to the piston and projecting outwardly of the cylinder, the piston rod passing through and being slidably mounted in an end cover of the cylinder; connector means for attachment of the cylinder to one of the vehicle chassis and the vehicle suspension member and for attachment of the piston rod to the other of the vehicle chassis and the vehicle suspension member; a gas working medium within the cylinder; and a first gas chamber formed by the swept volume of the cylinder and an associated second gas chamber communicating with the first gas chamber through a gas passageway which restricts the flow of gas therebetween.

In one embodiment, the second gas chamber has a variable volume.

In another embodiment, the second gas chamber is formed within the cylinder.

In another embodiment, the piston has a hollow interior forming the second gas chamber.

In another embodiment, the piston rod has a hollow interior and the second gas chamber is formed by the hollow interior of the piston and the hollow interior of the piston rod.

In another embodiment, a valve is mounted between the hollow interior of the piston and the hollow interior of the piston rod, the valve being operable to either connect or isolate the hollow interior of the piston and the hollow interior of the piston rod to vary the volume of the second gas chamber.

In another embodiment, the second gas chamber is filled with an open cell foam material which may or may not be divided into a multiplicity of air passages.

In another embodiment, the piston has a cover plate with one or more apertures to provide damping.

In another embodiment, the piston cover plate has a damping pipe or pipes fitted within the second gas chamber fluidly communicating between the second gas chamber and the first gas chamber.

In another embodiment, the piston rod is hollow and in communication with the second gas chamber within the piston by means of one or more apertures in a cover plate separating the interior of the piston from the hollow interior of the piston rod.

In another embodiment, one or more of the apertures have a damper pipe or pipes attached on the piston rod interior side permitting fluid communication between the hollow interior of the piston and the hollow interior of the piston rod.

In another embodiment, the piston rod chamber volume is filled with an open cell foam material which may or may not be divided into a multiplicity of air passages.

In another embodiment, an additional below piston chamber formed by the piston base, the cylinder wall and the piston rod bearing plate is suitably sealed so as to be airtight to allow a build-up of pressure as the piston approaches rebound position.

In another embodiment, means are provided for delivering pressurised air to the first gas chamber and also a means to deliver pressurised air into the additional below piston chamber.

In another embodiment, an elastomeric sealing membrane is sealingly attached to the cylinder at the cylinder head end and is sealingly attached to the piston at the other end such that at maximum bump/jounce position of the piston the membrane is at its minimum extension and extends elastically when the piston moves to the maximum extension at full rebound position.

In another embodiment, there is a stepper motor or similar actuator located in the piston rod and operably connected to a cover plate movably mounted at the top of the piston and with one or more apertures so designed as to block or open corresponding apertures in the piston cover in such a way as to provide a variety of combinations of apertures fluidly communicating between the second gas chamber within the piston and the first gas chamber so as to actively vary the levels of damping.

In another embodiment, a suitable heat transfer device is installed in the second gas chamber and communicating with the exterior so as to rapidly and advantageously transfer and dissipate heat built up in the second gas chamber to the exterior atmosphere.

In another embodiment, means is provided to permit air to be added to or expelled from the first gas chamber.

In another embodiment, there is provided a gas spring cylinder comprising a cylindrical wall forming a bore within which a complementary piston is slidably mounted, an inner end of the cylindrical wall opposite the piston being closed by a cylinder head, said cylinder head having a cylindrical reinforcing skirt extending outwardly therefrom to receive, engage and reinforce the cylindrical wall at the inner end of the cylindrical wall in that portion of the cylinder adjacent the cylinder head which is subjected to a rapid pressure increase as the piston approaches the cylinder head during a compression stroke.

In another embodiment, there is provided a vehicle suspension gas spring for mounting between a vehicle chassis and a vehicle wheel suspension member, including: a cylinder closed at one end; a piston slidably mounted within a bore of the cylinder; a gastight seal between the piston and the cylinder bore; a piston rod attached to the piston and projecting outwardly of the cylinder; connector means for attachment of the cylinder to one of the vehicle chassis and the vehicle suspension member and for attachment of the piston rod to the other of the vehicle chassis and the vehicle suspension member; a gas working medium within the cylinder; a first gas chamber formed by a swept volume of the cylinder; and a second gas chamber formed by a clearance volume of the cylinder communicating with the first gas chamber; wherein the second gas chamber has a variable volume.

In another embodiment, the volume of the second gas chamber is variable in response to gas pressure within the cylinder.

In another embodiment, the volume of the second gas chamber is directly proportional to the gas pressure.

In another embodiment, a cylinder head is slidably movable within the bore of the cylinder to vary the volume of the second gas chamber.

In another embodiment, the cylinder head is biased towards a position corresponding to a minimum clearance volume.

In another embodiment, the cylinder head is biased by a spring mounted between the cylinder head and a spring retainer spaced-apart therefrom on the cylinder.

In another embodiment, the spring retainer is formed by an end cover of the cylinder.

In another embodiment, a gastight seal is formed between the cylinder head and a bore of the cylinder.

In another embodiment, there is provided a vehicle suspension gas spring for mounting between a vehicle chassis and a vehicle wheel suspension member, including: a cylinder closed at one end; a piston assembly slidably mounted within the cylinder and sealingly engaging with a bore of the cylinder to form a gastight seal between the piston and the cylinder bore; a piston rod attached to the piston and projecting outwardly of the cylinder, the piston rod passing through and being slidably mounted in an end cover of the cylinder; connector means for attachment of the cylinder to one of the vehicle chassis and the vehicle suspension member and for attachment of the piston rod to the other of the vehicle chassis and the vehicle suspension member; a gas working medium within the cylinder; a first gas chamber formed by the swept volume of the cylinder; and a clearance volume chamber in communication with the first gas chamber, said clearance volume chamber comprising a residual volume remaining when the piston is at a full compression position with the cylinder.

In another embodiment, the clearance volume chamber has a variable volume.

In another embodiment, the clearance volume chamber is formed within the cylinder.

In another embodiment, the piston has a hollow interior forming at least part of the clearance volume chamber.

In another embodiment, the piston rod has a hollow interior and the clearance volume chamber is formed at least in part by the hollow interior of the piston rod.

In another embodiment, volume adjusting means is provided within the clearance volume chamber which is operable to vary the volume of the clearance volume chamber.

In another embodiment, the volume adjusting means is a moveable partition.

In another embodiment, an additional below piston chamber formed by a base of the piston, the cylinder wall and the cylinder end cover is suitably sealed so as to be airtight to allow a build-up of pressure as the piston approaches a rebound position.

In another embodiment, means is provided for delivering pressurized air to the first chamber and/or to deliver pressurized air into the additional below piston chamber.

In another embodiment, a cylindrical elastomeric sealing membrane is sealingly attached to the cylinder at the cylinder head end and is sealingly attached to the piston at the other end such that at maximum bump/jounce position of the piston the membrane is at its minimum extension and the membrane extends elastically when the piston moves to the maximum extension at full rebound position.

In another embodiment, there is a stepper motor or similar actuator located in the piston rod and operably connected to a partition or separator device located in the rod interior volume so as to actively vary the clearance volume to actively vary the spring rate.

In another embodiment, means is provided to permit air to be added to or expelled from the first gas chamber.

In another embodiment, a resilient bump stop is mounted on the cylinder head within the cylinder.

In another embodiment, the gas spring is provided in combination with an associated damper mounted between the piston rod and an exterior of the cylinder.

In another embodiment, there is provided a vehicle suspension gas spring for mounting between a vehicle chassis and a vehicle wheel suspension member, including: a cylinder closed at one end; a piston slidably mounted within a bore of the cylinder; a gastight seal between the piston and the cylinder bore; a piston rod attached to the piston and projecting outwardly of the cylinder; connector means for attachment of the cylinder to one of the vehicle chassis/body and the vehicle suspension member and for attachment of the piston rod to the other of the vehicle chassis/body and the suspension member; a gas working medium within the cylinder; a first gas chamber within the cylinder comprising a swept volume portion of the cylinder and a clearance volume portion of the cylinder, the first gas chamber communicating with an associated second gas chamber via a stop valve; and means for pressurizing gas in the second gas chamber for pressuring gas in the first gas chamber when the stop valve is open.

In another embodiment, the second gas chamber is part of an accumulator comprising a housing, an interior of the housing divided by an elastomeric bladder into the second gas chamber and a hydraulic fluid chamber, the hydraulic fluid chamber being connected to a source of pressured hydraulic fluid.

In another embodiment, the bladder and associated accumulator housing are such that when the second gas chamber is in communication with the first gas chamber and the gas pressure within the first gas chamber and the second gas chamber is at a desirable pressure, corresponding to a required neutral ride height unladen pressure, the bladder fills the accumulator housing.

In another embodiment, the cylinder is closed at one end by a cylinder head and at the other end by an end cap, the end cap having a central aperture for reception and slidable through passage of the piston rod which sealingly and slidably engages a sliding bearing mounted at the aperture, a gas feed pipe mounted between the cylinder head and the second chamber in the accumulator, the stop valve being mounted in the gas feed pipe.

In another embodiment, a gas tight bladder with an opening sealingly connected to a hollow piston rod.

In another embodiment, the piston crown side edge is such that the compressed gas pushes the piston crown sidewall edge against the cylinder bore to form a scraper to prevent extrusion of the bladder between the piston wall and the cylinder wall.

In another embodiment, there is an air actuated locking device so designed as to grip the piston rod so as to lock the gas strut in any desired position by means of an air actuated deformable collar through which the piston rod can move freely but which is deformed so as to grip the piston rod when subjected to air pressure.

In one embodiment of the invention to the invention, there is provided a vehicle suspension gas spring for mounting between a vehicle chassis and a vehicle wheel suspension member, including: a cylinder closed at one end; a piston assembly slidably mounted within the cylinder and sealingly engaging with a bore of the cylinder to form a gastight seal between the piston and the cylinder bore forming a first gas chamber bounded by the cylinder wall, the piston and the cylinder head; a piston rod attached to the piston and projecting outwardly of the cylinder, the piston rod passing through and being slidably mounted in an end cover of the cylinder; connector means for attachment of the cylinder to one of the vehicle chassis and the vehicle suspension member and for attachment of the piston rod to the other of the vehicle chassis and the vehicle suspension member; a gas working medium within the cylinder; and a clearance volume in communication with the first gas chamber, said clearance volume chamber comprising a residual volume remaining when the piston is at full compression position within the cylinder.

In a second embodiment, the clearance volume is separated from the swept volume by a gas passageway which restricts the flow of gas therebetween.

In another embodiment, the second gas chamber has a variable volume.

In another embodiment, the second gas chamber is formed within the cylinder.

In another embodiment, the piston has a hollow interior forming the second gas chamber or clearance volume.

In another embodiment, the piston has a hollow interior forming at least part of the second gas chamber or clearance volume.

In another embodiment, the piston rod has a hollow interior, and the second gas chamber or clearance volume is formed partly or wholly by the hollow interior of the piston and the hollow interior of the piston rod.

In another embodiment, a valve is mounted between the hollow interior of the piston and the hollow interior of the piston rod, the valve being operable to either connect or isolate the hollow interior of the piston and the hollow interior of the piston rod to vary the volume of the second gas chamber.

In another embodiment, the second gas chamber is filled with an open cell foam material which may or may not be divided into a multiplicity of air passages.

In another embodiment, the piston has a cover plate with one or more apertures to provide damping.

In another embodiment, the piston cover plate has a damping pipe or pipes fitted within the second gas chamber fluidly communicating between the second gas chamber and the first gas chamber.

In another embodiment, the piston rod is hollow and in communication with the second gas chamber within the piston by means of one or more apertures in a cover plate separating the interior of the piston from the hollow interior of the piston rod.

In another embodiment, one or more of the apertures have a damper pipe or pipes attached on the piston rod interior side permitting fluid communication between the hollow interior of the piston and the hollow interior of the piston rod.

In another embodiment, the piston rod chamber volume is filled with an open cell foam material which may or may not be divided into a multiplicity of air passages.

In another embodiment, an additional below piston chamber formed by the piston base, the cylinder wall and the piston rod bearing plate is suitably sealed so as to be airtight to allow a build-up of pressure as the piston approaches rebound position.

In another embodiment, means are provided for delivering pressurised air to the first gas chamber and also a means to deliver pressurised air into the additional below piston chamber.

In another embodiment, an elastomeric or other suitable material sealing membrane is sealingly attached to the cylinder at the cylinder head end and is sealingly attached to the piston at the other end such that at maximum bump/jounce position of the piston the membrane is at its minimum extension and extends elastically when the piston moves to the maximum extension at full rebound position.

In another embodiment, the elastomeric sealing membrane is sealingly connected to the piston so as to communicate with the interior of the piston rod with the gas supply valve positioned so as to enable charging of the strut and the elastomeric membrane through the hollow piston rod.

In another embodiment, there is a stepper motor or similar actuator located in the piston rod and operably connected to a cover plate movably mounted at the top of the piston and with one or more apertures so designed as to block or open corresponding apertures in the piston cover in such a way as to provide a variety of combinations of apertures fluidly communicating between the second gas chamber within the piston and the first gas chamber so as to actively vary the levels of damping.

In another embodiment, a suitable heat transfer device such as a heat pipe or other suitable device is installed in the interior of the strut and communicating with the exterior so as to rapidly and advantageously transfer and dissipate heat built up in the second gas chamber to the exterior atmosphere.

In another embodiment, means is provided to permit air to be added to or expelled from the first gas chamber.

In another embodiment, a resilient bump stop is mounted on the cylinder head within the cylinder so as to provide a cushion to prevent direct contact between the piston and the cylinder head.

In another embodiment, a gas spring cylinder comprises a cylindrical wall forming a bore within which a complementary piston is slidably mounted, an inner end of the cylindrical wall opposite the piston being closed by a cylinder head, said cylinder head having a cylindrical reinforcing skirt extending outwardly therefrom to receive, engage and reinforce the cylindrical wall at the inner end of the cylindrical wall in that portion of the cylinder adjacent the cylinder head which is subjected to a rapid pressure increase as the piston approaches the cylinder head during a compression stroke.

In another embodiment, volume adjusting means is provided within the clearance volume chamber which is operable to vary the volume of the clearance volume chamber or second gas chamber.

In another embodiment of the invention, the volume of the second gas chamber is variable in response to gas pressure within the cylinder.

In yet another embodiment, the volume of the second gas chamber is proportional to the gas pressure.

In a further embodiment of the invention, a cylinder head plate forming a moveable partition is slidably movable within the bore of the cylinder to vary the volume of the second gas chamber.

In a further embodiment, the cylinder head plate is retained in a position corresponding to a minimum clearance volume.

In another embodiment, the cylinder head plate is retained by on the one side a spring between the end cover and the cylinder head plate and on the other a retaining lip in the cylinder bore wall or a circlip or other retaining means.

In a further embodiment, a gas tight seal is formed between the cylinder head plate and the bore of the cylinder.

In yet another embodiment of the invention, the volume between the cylinder head plate and the end cover is vented to atmosphere.

In a further embodiment, there is fitted a non-return valve in the cylinder head plate permitting gas to flow from the volume between the cylinder head plate and the end cover into the clearance volume.

In a further embodiment of the invention, the internal damping constriction means is removed and the gas spring is joined to a hydraulic damper so as to form an externally integrated hydro pneumatic strut with single common upper and lower mounting means to fit to a vehicle and its suspension system In one further embodiment, there is a first gas chamber within the cylinder comprising a swept volume portion of the cylinder and a clearance volume portion of the cylinder, the first gas chamber communicating with an associated second gas chamber via a stop valve, and means for pressurizing gas in the second gas chamber for pressurizing gas in the first gas chamber when this stop valve is open.

In another embodiment of the invention, the clearance volume is connected by a pipe or other suitable means to an accumulator comprising a housing, an interior of the housing divided by an elastomeric bladder or other suitable means into a gas chamber and a hydraulic fluid chamber the hydraulic fluid chamber being connected to a source of pressurised hydraulic fluid. There is fitted between the accumulator and the clearance volume a controllable valve to open and close communication between the clearance volume and the accumulator.

In another embodiment, the bladder and associated accumulator housing volumes are such that when the second gas chamber is in communication with the first gas chamber the pressure in the first and second gas chambers is at a desired pressure corresponding to a required neutral ride height unladen pressure and the bladder fills the accumulator housing. By pressurising the hydraulic fluid with the valve open the gas in the accumulator is discharged into the clearance volume at a pressure suited to the laden weight condition. The valve is then closed when the gas has been discharged from the accumulator.

In another embodiment, the control valve may be automatically controlled to adjust the spring rate to suit the load.

In another embodiment, the cylinder is closed at one end by a cylinder head and at the other end by an end cap, the end cap having a central aperture for reception and slidable through passage of the piston rod which sealingly and slidable engages a sliding bearing mounted at the aperture, a gas feed pipe mounted between the cylinder head and the second chamber in the accumulator, the stop valve being mounted in the gas feed pipe.

A further embodiment features a locking device whereby the gas strut may be locked in any chosen position.

In another embodiment, the strut is provided with a gas tight bladder with a charging aperture. The bladder is sealingly attached to the piston in such a way as to communicate with the hollow piston rod. The bladder occupies the clearance volume thus sealing the gas chambers without the need for piston ring sealing. A filling means is provided on the piston rod so as to permit charging the bladder with pressurized gas.

BRIEF DESCRIPTION OF THE DRAWINGS

The invention will be more clearly understood by the following description of some embodiments thereof, given by way of example only, with reference to the accompanying drawings.

DETAILED DESCRIPTION

Figure 1:
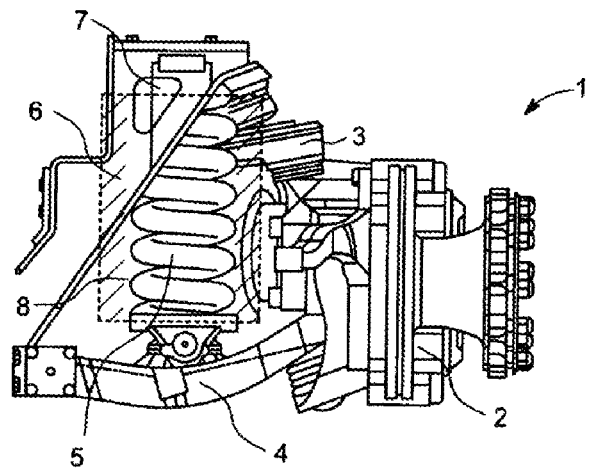
FIG. 1 is a general view of a double wishbone suspension using the invention in comparison with equivalent coil spring and air bag installations.

FIG. 1 depicts a typical independent suspension system 1 for a high mobility vehicle. The suspension system 1 is of the double wishbone (short arm/long arm) configuration. The suspension system 1 comprises an upper control arm 3 and a lower control arm 4, each of which is rotatably connected at their inner end to a chassis mounting plate 6 and rotatably connected at their outer end to a wheel hub assembly 2. The suspension has a coil spring 5 rotatably mounted at its lower end to the lower control arm 4 and at its upper end to the chassis mounting plate 6. The space claim 7 for a typical embodiment of the invention is shown in comparison to the original coil spring 5 and a typical space claim 8 for a conventional bellows type air spring. It can be readily appreciated by one versed in the art that the much smaller diameter of the invention permits the designer to move the lower mounting point of the air spring of the invention outboard on the lower control arm 4 thus reducing the required spring force and bending stresses imposed on the lower control arm 4 and so permitting a lighter, cheaper control arm and a smaller capacity and lighter air spring.

Figure 2:
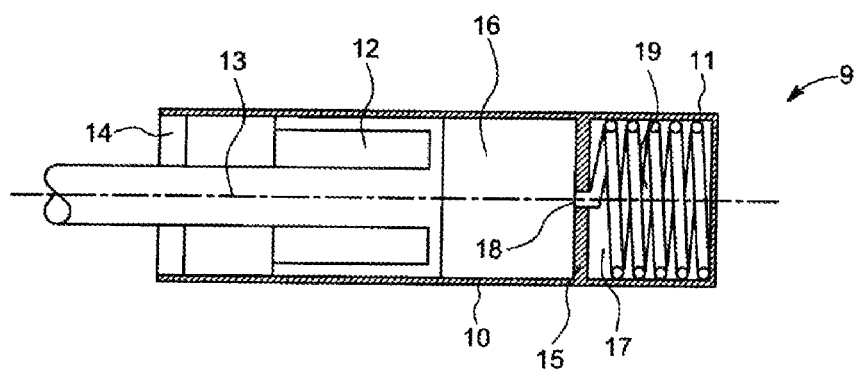
FIG. 2 is a schematic explanatory illustration of an air spring according to the invention.

The functional principle of the invention is shown diagrammatically in FIG. 2 which illustrates an air spring according to the invention indicated generally by the reference numeral 9. The air spring 9 comprises a cylinder 10 sealed at one end by a cylinder head 11 and being open at the other end. The cylinder 10 contains a piston 12 mounted on a piston rod 13 which is slidably fitted in an end cap and bearing assembly 14 secured in the open end of the cylinder 10. The piston 12 is thus free to slide inside the cylinder 10 and is sealed to prevent leakage past the piston 12 by suitable sealing devices well known to the art such as for example piston rings (not shown). The piston rod 13 is likewise sealed (not shown), to prevent leakage past the associated bearing (not shown) in the end cap 14. The cylinder space between a top of the piston 12 and the cylinder head 11 is divided by a fixed partition 15 into two chambers, namely, a first chamber 16 and an associated second chamber 17, which are sealed thus one from the other. An aperture 18 in the partition 15 is connected to a damping pipe 19 suitably coiled as required to fit a suitable length into the second chamber 17. As the piston 12 is moved towards the cylinder head 11 the air or other suitable gas in the first chamber 16 is compressed and forced through the damping pipe 19 into the second chamber 17 thus creating damping losses due to the air flow in the damping pipe 19.

Figure 3:
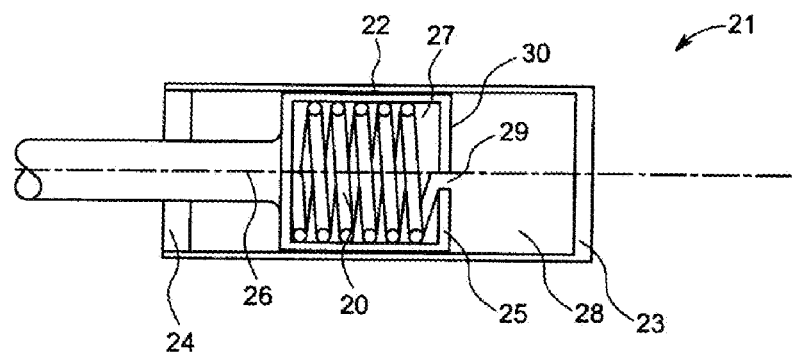
FIG. 3 is a schematic illustration of an air spring according to another embodiment of the invention.

Referring now to FIG. 3, there is illustrated an air spring according to a second embodiment of the invention, indicated generally by the reference numeral 21. Parts similar to those described previously are assigned the same reference numerals. In this embodiment a cylinder 22 has a cylinder head 23 sealably fitted at one end and an end cap and bearing assembly 24 fitted at the other end. A piston 25 is slidably and sealably fitted into the cylinder 22 and is mounted on a piston rod 26 which is slidably and sealably fitted into the end cap 24. The internal volume of the cylinder 22 between the piston 25 and the cylinder head 23 (that is the swept volume) forms a first chamber 28 and a hollow interior of the piston 25 forms a second chamber 27 sealed from the first chamber 28. An aperture 29 in a crown 30 of the piston 25 is connected to a damping pipe 20 suitably coiled, as required, to fit a suitable length within the second chamber 27. Thus, the first chamber 28 and the second chamber 27 communicate fluidly via the damping pipe 20.

As the piston 25 moves towards the cylinder head 23 the air in the first chamber 28 is compressed and forced through the damping pipe 20 into the second chamber 27 within the piston 25 thus creating damping forces in the air spring air damper system.

By enclosing the second chamber volume 27 inside the hollow piston 25 the equivalent second chamber 17 of the embodiment of FIG. 2 is eliminated and the overall length of the air spring air damper system 21 and the cylinder 22 is thereby reduced whilst maintaining the same effective stroke length, resulting in a lighter and cheaper assembly.

It will be appreciated that the illustrations in FIG. 2 and FIG. 3 are explanatory only and are not to scale or proportion.

Figure 4:
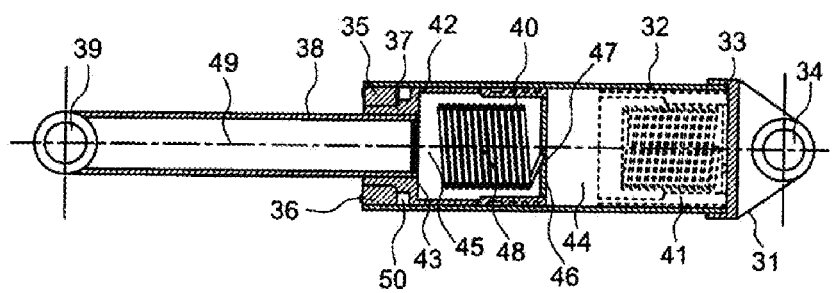
FIG. 4 is a sectional elevational view of air spring according to yet another embodiment of the invention shown in different positions of use.

Referring now to FIG. 4, there is illustrated an air spring according to a third embodiment of the invention, indicated generally by the reference numeral 31. Parts similar to those described previously are assigned the same reference numerals. The air spring 31 comprises a cylinder 32 which is sealed at one end by a cylinder head 33. The cylinder head 33 includes a journal bore 34 in which is inserted a journal bearing (not shown) to form a rotatable mounting for the air spring 31. The other end of the air spring cylinder 32 has an end cover 35 which incorporates a sliding bearing 36 and a seal 37. A piston rod 38 is located by and slides in the sliding bearing 36. At one end of the piston rod 38 there is a journal bore 39 in which is inserted a journal bearing (not shown) to form a second rotatable mounting for the air spring 31. The other end of the piston rod 38 is rigidly fixed to a piston 40 by means of a threaded fastening 42, though it will be understood by persons versed in the art that any suitable alternative fixing method may be used. The piston rod 38 may be a solid shaft or may be hollow and is sealed at the piston end by a sealing plate 43. The piston 40 is slidably fitted into the cylinder 32 and is sealed to prevent leakage from a first chamber 44 formed by the internal swept volume of the cylinder 32 between the piston 40 and the cylinder head 33. This sealing may be by conventional piston rings well known in the art.

The piston 40 has an internal cavity forming a second chamber 45 which is sealed at the piston crown by a cover plate 46 which has one or more apertures 47 forming a fluid path between the second chamber 45 and the first chamber 44 formed by the cylinder swept volume.

A length, or several lengths, of coiled damping pipe 48 is enclosed within the piston 40 in the second chamber 45 and is fluidly connected to the first chamber 44. The cover plate 46 may also in addition to or instead of pipes contain one or more apertures.

When the piston 40, shown in dotted lines 41 at full jounce (bump) travel, travels towards the cylinder head 33 the air in the first chamber 44 is compressed and forced through the damper pipe 48 and/or various apertures/orifices 47 into the second chamber 45 within the piston 40. The air flow through the damper pipe 48 or pipes and/or the damper orifices 47 creates a damping force in the air spring air damper system 31.

Figure 5:
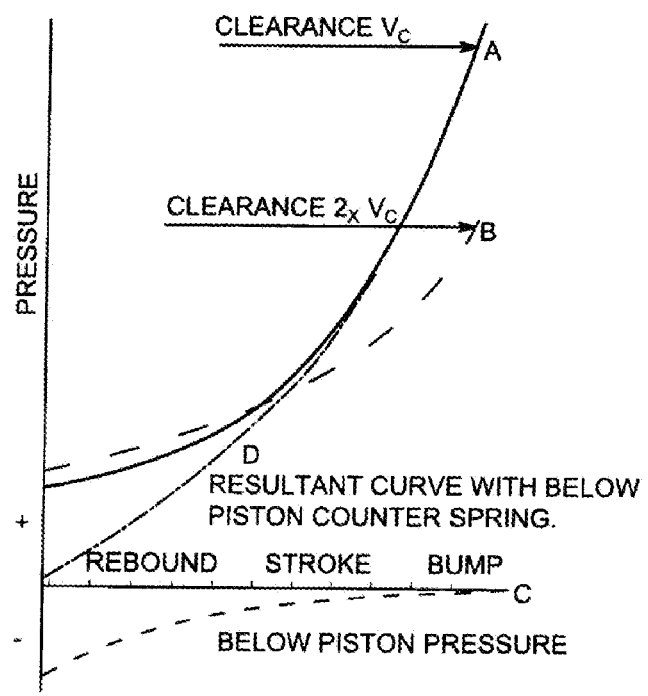
FIG. 5 is a graph showing the effect of clearance volume and counter pressure on the air spring performance.

It is well known in the art that the polytropic compression spring rate curve is a function of the ratio of the cylinder swept volume forming the first chamber 44 to the piston chamber volume forming the second chamber 45 also known as the clearance volume. An example of this relationship is shown in a typical air spring load deflection curve illustrated in FIG. 5. If desired the spring rate of air spring 31 may be modified by adding some or all of the piston rod internal volume 49 to the volume of the second chamber 45 by removing or changing the location of the sealing plate 43. Curve "A" in FIG. 5 represents the polytropic compression curve of the air spring 31 for a second chamber 45 volume. Curve "B" represents the compression curve when the second chamber 45 volume is increased by addition of the piston rod internal volume 49. It can be seen that the maximum pressure and the spring rate are both reduced by increase of the second chamber 45 volume. The reduced spring rate results in a softer suspension. By having an adjustable aperture between the second chamber 45 and the piston rod internal volume 49 an actively adjustable spring rate can be achieved allowing the air spring rate to be adapted to terrain requirements.

There is an additional air chamber volume 50 formed below the piston 40 formed by the cylinder 32 wall, the bottom of piston 40 and the cylinder end cover 35. As the piston 40 moves towards the cylinder end cover 35 the pressure in the first chamber 44 decreases and the pressure in the additional chamber volume 50 increases. This effect is shown in FIG. 5 by the curve "C". This relationship can be used to greatly improve the performance of a suspension system incorporating the air spring air damper 31. Unlike the situation with a mechanical spring in which the spring force reduces to zero when the load is removed as the suspension moves into rebound in an airspring when the spring goes to full rebound there remains a residual positive force in the spring. Under lateral acceleration this residual force maintains the lightly loaded wheel at full rebound thus increasing the roll angle resulting in reduced stability of the vehicle. Curve "D" in FIG. 5 represents the force resultant curve of the air spring when the above piston force and the below piston force are combined. The resultant spring force can be reduced to zero at rebound thus improving stability under lateral acceleration. In the example shown by curve "C" the pressure in the below piston additional air chamber volume 50 is more or less atmospheric at static ride height. By providing a pressurised air supply to the below piston additional air chamber volume 50 the pressure in the additional air chamber volume 50 can be increased thus providing active control of the air spring 31 spring deflection curve characteristic. In addition, this feature can be used to lift individual wheels if required. Additionally, the overall damping response of the air spring air damper 31 may be modified or tuned to provide certain desirable responses by providing additional orifices or damping pipes fluidly connecting the piston rod internal volume chamber 49 to the second chamber 45 within the piston 40 using suitable apertures in the sealing plate 43.

Though a significant number of practitioners versed in the art maintain that the form of restrictor does not influence the damping force generated but only the frequency response nonetheless this present invention may incorporate a number of different types of restrictor to elicit differing damping responses both in magnitude and in frequency. With an orifice type restrictor, the pressure drop is proportional to the area of the orifice and so to the square of the diameter of the orifice. In pipe flow the pressure drop is a function of the pipe length and of course the interior surface of the pipe.

Figure 6:
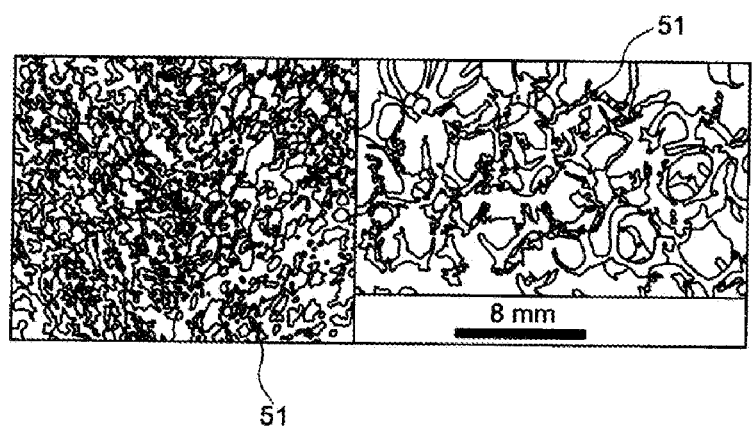
FIG. 6 shows a typical example of a porous open cell foam suitable for use as a damping medium.
Figure 7:
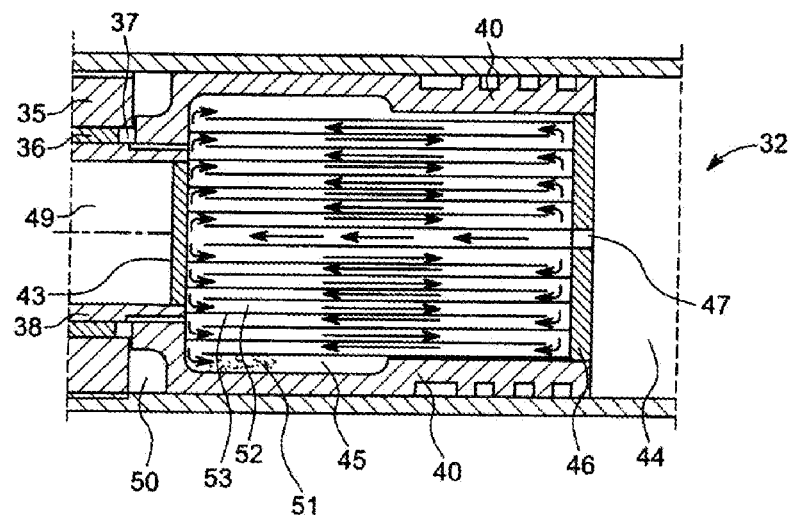
FIG. 7 is a detail sectional elevational view of a portion of another air spring according to the invention illustrating the use of an open cell foam filling the piston chamber and laid out in concentric flow paths.

Referring in particular to FIG. 6 and FIG. 7, another response to fluid flow resistance may be found using an open cell structure to generate frictional losses in the airflow. In yet another embodiment of the invention, in order to increase or tune the energy dissipation, the second chamber 45 formed by the interior of the piston 40 is filled with an open cell foam material 51 similar to those illustrated in FIG. 6 which may be metallic or ceramic or other suitable material. Such materials have a greatly extended surface area with voids which may be higher than 90% of volume. Thus, a large frictional surface may be exposed to the airflow. The flow path may be extended and the flow area decreased thus increasing the velocity to increase the friction loss by, for example, dividing the material into a series of concentric passages 52 as illustrated in FIG. 7. Such passages may be constructed in a number of ways by, for example, rolling a thin sheet of foam material with a separating membrane 53 to divide the air passages one from the other as indicated in FIG. 7. Of course, other methods may be used to increase the flow path whilst still conforming to the principles revealed herein.

Figure 8:
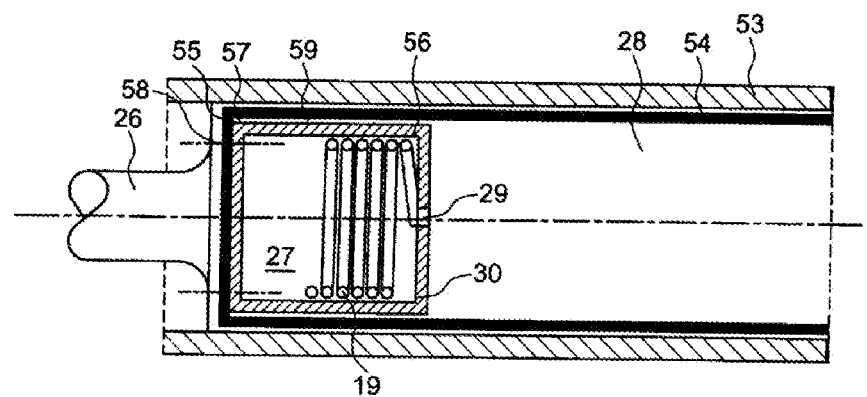
FIG. 8 shows an air spring according to another embodiment of the invention using a stretchable elastic membrane to seal the air spring pressure chambers and a coiled damping tube within the piston chamber.

The air spring 31 shown in FIG. 4 relies on a series of piston ring seals (not numbered) that are well known in the art. An alternative innovative membrane type seal is shown in FIG. 8. In conventional air bellows type air springs, the maximum air pressure that may be used is limited by the burst strength of the bellows fabric. Such air springs are composed of carefully designed rubber and fabric flexible members to allow easy folding of the membrane whilst having sufficient strength to withstand the air spring operating pressures—typically in the region of a maximum of 8 to 10 bar. Such air bellows concepts cannot sustain the high pressures—up to and exceeding in some cases bar—experienced in the present air spring invention.

Referring to FIG. 8 an air spring cylinder 53 is fitted with an internal elastomeric membrane 54 of cylindrical configuration which is sealed at one end by the cylinder head (not shown) and at the other end forms a continuous envelope circularly shaped at the bottom 55 to fit around and enclose a hollow piston 56 to which it is secured by being sandwiched between a bottom plate 57 of the piston 56 and a top flange 58 of the piston rod 26. There is a gap or cavity 59 between the skirt of the piston 56 and the inside wall of the cylinder 53.

As shown in FIG. 8, the piston 56 is at the extreme extent of its expansion stroke. The membrane 54 is so designed that when the piston 56 is at the extent of its compression stroke (sometimes described as top dead centre) the membrane 54 occupies the cavity 59 between the piston 56 and the cylinder 53 wall. As the piston 56 travels towards the bottom of its expansion stroke the membrane 54 is elastically stretched to the configuration shown in FIG. 8. Unlike the conventional air bag which is required to withstand the air pressure in the chamber enclosed by the air bellows the membrane 54 is not subjected to the pressure in the first chamber 28 as it is supported by the cylinder 53 internal wall and by the piston 56 bottom plate 57. As a result of the configuration, the elastic membrane does not require the strength necessary to withstand the stress imposed by the high internal pressure which would rupture conventional airbag containment systems. It will be appreciated that FIG. 8 is only one illustration of the inventive principle and other variations of this principle are possible within the scope of this invention.

In another embodiment of the invention provision is made to permit air to be added to or expelled from the swept volume chamber to vary ride height or to offset the effect of temperature variation of the air or to provide active control of the suspension spring response.

This invention presents an innovative non intuitive departure from the accepted norms of the current teaching in the art—the reservoir is smaller than the spring chamber, the ratio of piston travel to chamber diameter is greater than advocated by current teaching in the art, the pressure is several orders of magnitude greater than the present art and flows through restrictors can be choked and both turbulent and laminar.

Figure 9:
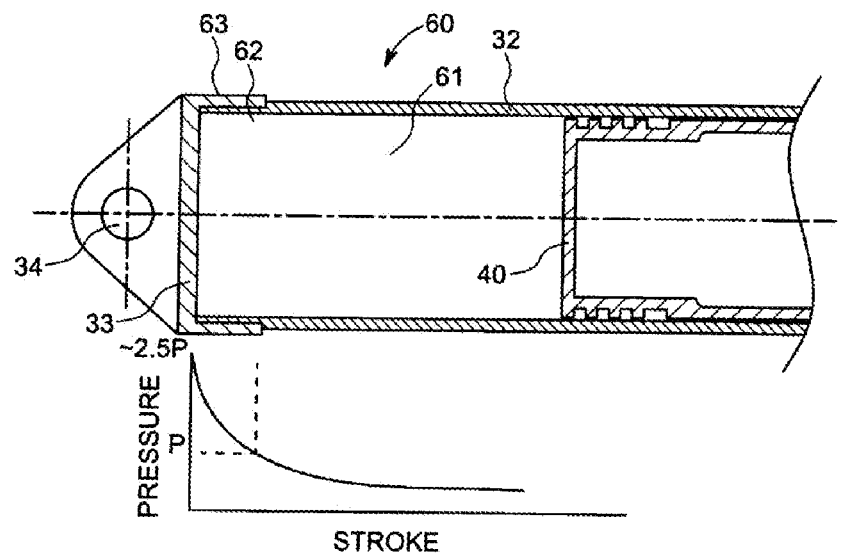
FIG. 9 is a detail sectional elevational view of an air spring cylinder according to another embodiment of the invention; and a graph showing a typical gas pressure profile for the interior of the cylinder during operation.
Figure 10:
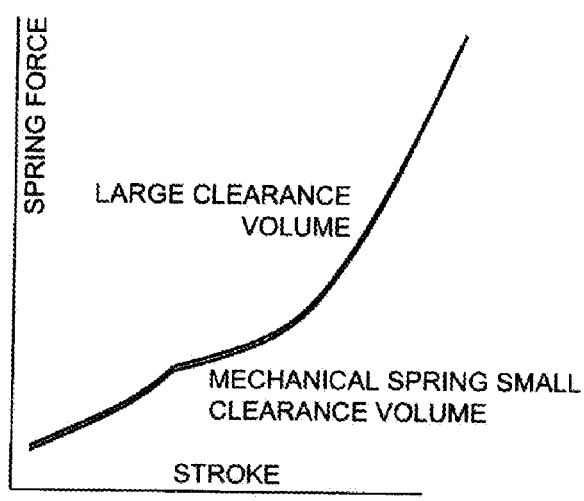
FIG. 10 is a graph showing the spring performance of a gas spring with variable clearance volume according to the invention.

Referring now to FIG. 9 and FIG. 10, there is shown an air spring cylinder according to another embodiment of the invention, indicated generally by the reference numeral 60. Parts similar to those described previously are assigned the same reference numerals. The cylindrical wall 32 forms a bore 61 within which a piston 40 is slidably mounted. An inner end 62 of the cylindrical wall 32 opposite the piston 40 is closed by a cylinder head 33. The cylinder head 33 has a cylindrical reinforcing skirt 63 or ring extending outwardly therefrom to receive, engage and reinforce the cylindrical wall 32 at the inner end 62 of the cylindrical wall 32 in that portion of the cylinder adjacent the cylinder head 33 which is subjected to a rapid pressure increase as the piston approaches the cylinder head 33 during a compression stroke.

It will be noted that the reinforcing skirt 63 or ring reinforces the cylinder wall 32 so that the effective wall thickness in the high-pressure zone at the inner end 62 of the cylinder is much greater than the actual cylinder wall thickness. In conventional high pressure gas springs, the cylinder wall thickness is based on the maximum pressure experienced in the cylinder. Typically, suitable proof tests are conducted on the cylinder with the piston at the bottom of its stroke. This is not representative of the actual situation in which the pressure in the cylinder is relatively low, in some cases for about 80% of the stroke, and rising rapidly in the last 20% of the stroke. This is due to the nature of the polytropic compression curve and is illustrated in FIG. 9 which shows a typical compression curve in relation to a typical gas spring cylinder. In this case, it can be seen that the overlap of the cylinder head reinforces the cylinder wall for the last 20% of the stroke during which the pressure increases by a factor of 2.5. Thus, the cylinder wall can be designed for a pressure P, rather than a pressure of 2.5 P resulting in a lighter and cheaper cylinder.

As described in the background to the Invention the clearance volume has an important influence on the spring rate of a gas spring. A desirable spring rate is generically illustrated in FIG. 10. In accordance with the present invention the disadvantages of excessive pressure/force at bump and rebound and of a stiff spring rate around the neutral ride point are eliminated in accordance with the present invention by providing a means of increasing the clearance volume at maximum compression giving a desired maximum bump force and of providing a decreased clearance volume at rebound so reducing the rebound force to a desired level and additionally providing a desired softer spring rate around the neutral ride point to optimise ride quality as illustrated in FIG. 10.

Figure 11:
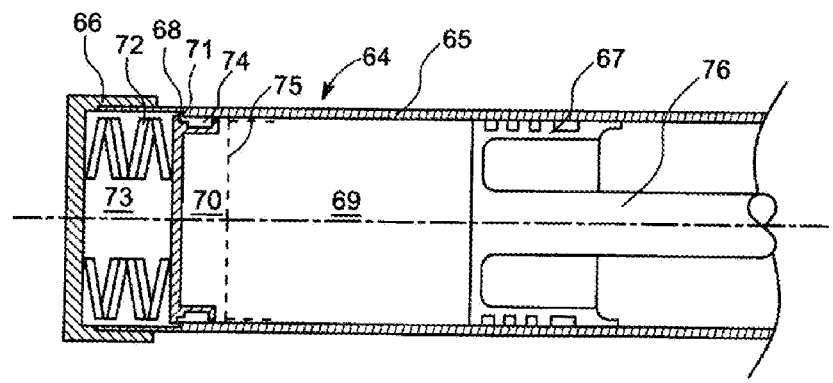
FIG. 11 is a diagrammatic sectional elevational view of a portion of a gas spring with variable clearance volume according to the invention.

Referring to FIG. 11, there is shown another gas spring according to the invention indicated generally by the reference numeral 64. The gas spring 64 comprises a cylinder 65 closed at one end by an end cover 66 and a piston 67 mounted within a bore of the cylinder 65. The piston 67 is attached to a piston rod 76 attached to the suspension or chassis/body of the vehicle (not shown). A moveable cylinder head plate 68 is located between the end cover 66 and a clearance volume 70 within the cylinder 65 defined by the volume 70 in the cylinder 65 when the piston 7 reaches its maximum compression stroke as indicated by the dotted line 75. The cylinder head plate 68 is retained against an annular restraining lip 71 in a sidewall of the cylinder 65 by springs 72 mounted between the cylinder head plate 68 and the end cover 66. A second volume 73 is defined by the end cover 66, the cylinder 65 and the cylinder head plate 68. As the piston 67 moves from the rebound position towards the cylinder cover 66 the pressure in the cylinder 65 increases in accordance with the polytropic compression curve. The spring 72 holding the cylinder head plate 68 against the annular lip 71 is so designed that at a predetermined pressure the gas force in cylinder volume 69 begins to move the cylinder head plate 68 towards the end cover 66 compressing the spring 72 and thus reducing the volume 73 and correspondingly increasing the clearance volume 70. When the piston 67 reaches its maximum compression at line 75 the spring 72 is designed to be fully compressed and the enlarged clearance volume is the sum of volume 73 and volume 70. During the compression of spring 72 the spring rate of spring 72 is so designed as to give a favourable spring rate around the neutral ride point to provide a desired ride quality. From rebound to the point where the cylinder head plate 68 begins to move the spring rate is relatively high. As the cylinder head plate 68 is moving the spring rate is dictated by the spring rate of spring 72. When spring 72 is fully compressed the spring rate resumes a relatively high rate in accordance with the polytropic compression curve without exceeding the mechanical constraints of the system as would be the case if the smaller clearance volume 70 were retained. If build-up of gas pressure in the volume 73 is undesirable the volume 73 may be vented to atmosphere or into volume 70 by means of a one-way valve in the cylinder head plate 68 communicating with volume 70 in which case the spring rate would be that of the spring 72 or it may be sealed in which case the spring force acting on the cylinder head plate 68 would be a combination of the mechanical spring rate and the force resulting from polytropic compression of the gas in the volume 73.

Figure 12:
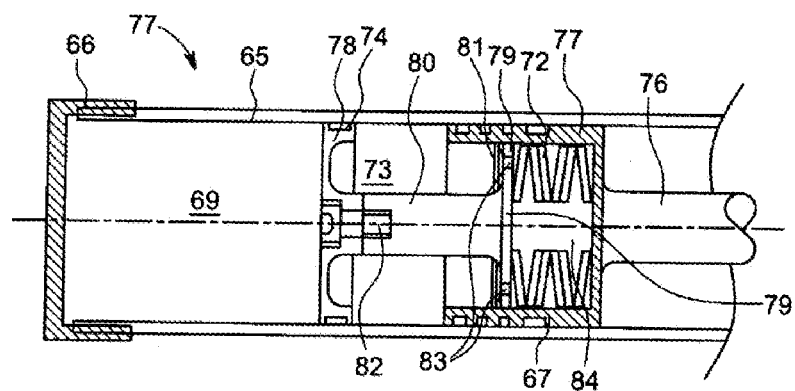
FIG. 12. is a diagrammatic sectional elevational view of a portion of a gas spring with variable clearance volume within the piston according to the invention.

Referring to FIG. 12, there is shown another gas spring according to the invention indicated generally by the reference numeral 77 in which the clearance volume adjustment mechanism is contained in the piston 67 rather than at the cylinder head end of the strut as described in FIG. 11. The gas spring 77 comprises a cylinder 65 closed at one end by an end cover 66 and a piston 67 slidably mounted within a bore of the cylinder 65. The piston 67 is attached to a piston rod 76 attached to the suspension or chassis/body of the vehicle (not shown). A moveable piston crown plate 78 is slidably located within a bore of the piston 67 by means of the flange 79 attached to the rod 80. The crown plate 78 is attached to the rod 80 by means of the screw 82. It will be appreciated that the mechanical structure of the assembly comprising elements 78, 80, 79, may be accomplished in many ways without deviating from the principles of the invention. The crown plate 78 is sealed in the cylinder bore such seal being represented in FIG. 12 by the seal 74. A desired force is exerted on flange 79 by a spring 72 and the travel of flange 79 in the direction of the cylinder head 66 is restrained by the circlip 81 set into the bore of piston 67. It will be appreciated that other means may be used to restrain flange 79. As the piston 67 moves towards the cylinder head 66 the pressure increases in volume 69 until such point that the force on the crown plate 78 exceeds the force exerted by spring 72 on the flange 79 and the crown plate 78 will be forced to move towards the piston 67 thus decreasing the volume 73 and correspondingly increasing the volume 69 resulting in an increased clearance volume. The flange 79 has a suitable clearance or alternatively vent holes 83 to prevent undesired build-up of pressure in the spring chamber 84. Similarly, volume 84 may be vented to atmosphere to avoid pressure build-up in volume 73 as it is reduced. In some cases, it may be desirable to allow pressure in volume 73 to build-up to supplement the force of spring 72.

Figure 13:
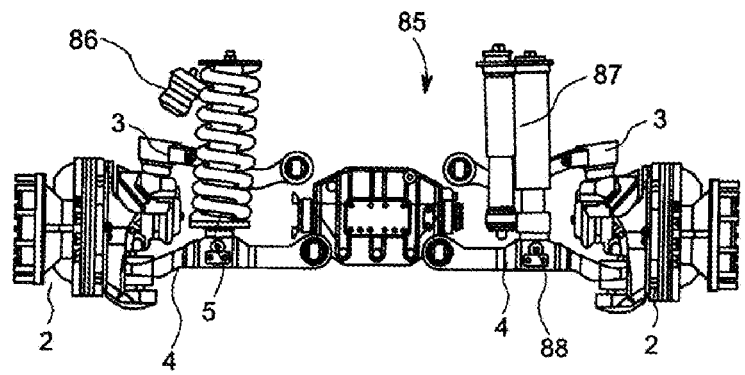
FIG. 13 is an elevational view of a double wishbone suspension using an airspring and integrated damper assembly of the invention (right hand side) in comparison with an equivalent coil spring suspension (left hand side).

FIG. 13 depicts, for comparison purposes only, a typical independent suspension system 85 for a high mobility vehicle comprising on the left-hand side a conventional coil spring and hydraulic damper assembly 5 (on the left-hand side of the drawing) and on the right-hand side an airspring and integrated hydraulic damper assembly 87 according to the invention. The suspension system 85 is of the double wishbone (short arm/long arm) configuration. The suspension system 85 comprises an upper control arm 3 and a lower control arm 4, each of which is rotatably connected at their inner end to a chassis mounting plate 6 (see FIG. 1) and rotatably connected at their outer end to a wheel hub assembly 2. The conventional version of the suspension has a coil spring 5 rotatably mounted at its lower end to the lower control arm 4 and at its upper end to the chassis mounting plate 6. A bump stop 86 is provided to supplement the spring force at extreme bump of the suspension. The integrated airspring damper assembly 87 according to the invention uses the same mounting points as the coil spring assembly 5. In this way the suspension assembly is unaltered. In typical airbag installations a separate mounting is required for the hydraulic damper thus necessitating a more complex and heavier wishbone to provide for the dual load paths imposed by the separate mounting points.

FIG. 13 illustrates the space claim of the airspring damper assembly 87 of the invention for a typical embodiment of the invention in comparison to the original coil spring 5 and a typical space claim 8 for a conventional bellows type airspring as shown in FIG. 1. It can be readily appreciated by one versed in the art that the much smaller diameter of the airspring 87 of the invention permits the designer to move the lower mounting point of the airspring 87 of the invention outboard on the lower control arm 4 thus reducing the required spring force and bending stresses imposed on the lower control arm 4 and so permitting a lighter, cheaper control arm and a smaller capacity and so lighter airspring 87.

Figure 14:
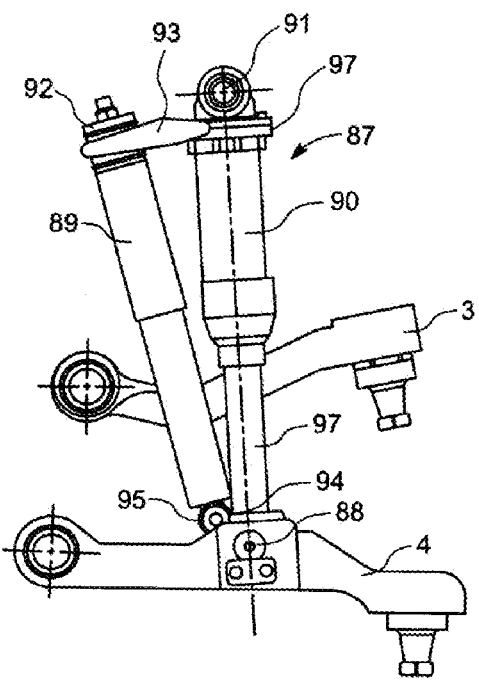
FIG. 14 is an elevational view of portion of a double wishbone suspension using an airspring damper assembly according to the invention.
Figure 15:
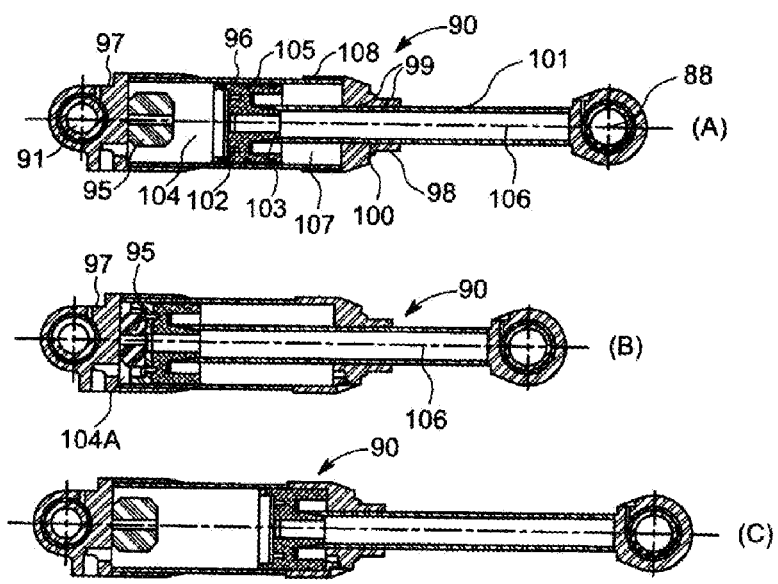
FIG. 15 shows detail sectional elevational views of an airspring according to the invention forming portion of the airspring damper assembly shown in FIG. 14, shown in different positions of use.
Figure 16:
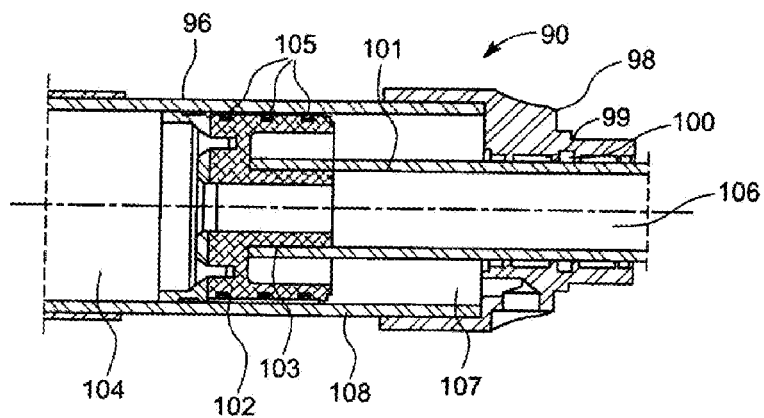
FIG. 16 is an enlarged detail sectional elevational view of portion of the airspring shown in FIG. 15.

Referring now in particular to FIGS. 14 to 16, there is shown an integrated airspring damper assembly according to another embodiment of the invention, indicated generally by the reference numeral 87.

FIG. 14 shows an example of the installation of the integrated airspring damper assembly 87 of the invention comprising a hydraulic damper 89 and an airspring 90 according to the invention in an independent suspension. The hydraulic damper 89 has a pin type upper mounting and a spherical bearing lower mounting. The damper 89 is pivotably mounted to the upper and lower airspring 87 mountings.

FIG. 14 is a general arrangement drawing of one typical embodiment of the integrated airspring damper assembly 87 of the invention. The integrated airspring damper assembly 87 comprises a conventional hydraulic damper 89 and an airspring 90 according to the invention. The airspring 90 has upper and lower mounting bearings 91, 88 which are respectively mounted on the chassis (not shown, for example, the chassis mounting plate 6 mentioned previously) at the upper bearing 91 and to a suspension element, in this case the lower control arm 4, at the lower bearing 88 respectively. The upper spring bearing 91 may be of the spherical bearing type, rubber cushion or any other suitable mounting type.

An upper damper mounting 92 is supported by an extension of an upper spring bearing mounting assembly 93. The upper damper mounting 92 may be of the pin type, spherical bearing or any other suitable mounting type. The airspring 90 has a lower mounting bearing housing 94 with an extension piece to hold a bearing or other suitable mounting point to fit the damper lower bearing 95. Thus, the integrated airspring damper assembly 87 according to the invention forms a single assembly 87 requiring only one upper mounting point to the vehicle chassis or body and one only lower mounting bearing on the suspension arm 4 or other suitable suspension mounting point.

Referring now in particular to FIG. 15 and FIG. 16, the airspring 90 is shown in use. In FIG. 15, the airspring 90 is shown in three positions (A) static ride, (B) full bump (jounce), (C) full rebound. Parts similar to those described previously are assigned the same reference numerals. The airspring 90 comprises a cylinder 96 which is sealed at one end by a cylinder head 97. The cylinder head 97 includes a journal bore 91 in which is inserted a journal bearing (not shown) to form a rotatable mounting for the airspring 90. The other end of the airspring cylinder 96 has an end cover 98 which incorporates sliding bearings 99 and a seal 100. A piston rod 101 is located by and slides in the sliding bearings 99.

At one end of the piston rod 101 there is a journal bore 88 in which is inserted a journal bearing (not shown) to form a second rotatable mounting for the airspring 90. The other end of the piston rod 101 is rigidly fixed to a piston 102 by means of a threaded fastening 103, though it will be understood by persons versed in the art that any suitable alternative fixing method may be used. The piston rod 101 may be a solid shaft or may be hollow and may be open or sealed at the piston end by a sealing plate (not shown).

The piston 102 is slidably fitted into the cylinder 96 and is sealed to prevent leakage from a first chamber 104 formed by the internal swept volume of the cylinder 96 between the piston 102 and the cylinder head 97. This sealing may be by conventional piston rings 105 well known in the art or by means of a flexible membrane more fully explained below.

When the piston 102, is at full jounce (bump) travel, (B) the airspring force is increased by compression of a rubber bump stop 95 internally mounted in the cylinder 96 on the cylinder head 97. This replaces the external rubber bump stop 6a 86 in the conventional suspension arrangement illustrated in FIG. 13, so simplifying the installation of the suspension in the chassis.

It is well known in the art that the polytropic compression spring rate curve is a function of the ratio of the cylinder swept volume forming the chamber 104 to the volume remaining when the piston 102 is at full compression stroke, also known as the clearance volume. In the embodiment shown in FIG. 15 the clearance volume comprises the above piston volume 104a at full bump (FIG. 15B) and the volume 106 of the hollow piston rod 101. This clearance volume may be varied by altering the volume 106.

An example of the relationship between swept volume and clearance volume is shown in a typical airspring load deflection curve illustrated in FIG. 5. If desired the spring rate of airspring 90 may be modified by varying the piston rod internal volume 106. Curve "A" in FIG. 5 represents the polytropic compression curve of the airspring 90 for a particular value of chamber 106 volume. Curve "B" represents the compression curve when the chamber volume 106 is increased by a factor of approximately ×2. It can be seen that the maximum pressure and the spring rate are both reduced by increase of the clearance volume chamber 106 volume. The reduced spring rate results in a softer suspension. By having an adjustable partition in chamber 106 an actively adjustable spring rate can be achieved allowing the airspring rate to be adapted to terrain requirements for optimum spring performance.

As best seen in FIG. 16, there is an additional air chamber volume 107 formed below the piston 102 formed by the cylinder wall 108, the bottom of piston 102 and the cylinder end cover 98. As the piston 102 moves towards the cylinder end cover 98 the pressure in the first chamber 104 decreases and the pressure in the below piston chamber volume 107 increases. This effect is shown in FIG. 5 by the curve "C". This relationship can be used to greatly improve the performance of a suspension system incorporating the integrated airspring damper assembly 87 of the invention. Unlike the situation with a mechanical spring in which the spring force reduces to zero when the load is removed as the suspension moves into rebound, in an airspring when the spring goes to full rebound there remains a residual positive force in the spring. Under lateral acceleration this residual force maintains the lightly loaded wheel at full rebound thus increasing the roll angle resulting in reduced stability of the vehicle. Curve "D" in FIG. 5 represents the force resultant curve of the airspring when the above piston force and the below piston force are combined. The resultant spring force can be reduced to zero at rebound thus improving stability under lateral acceleration. In the example shown by curve "C" the pressure in the below piston additional air chamber volume 107 is more or less atmospheric at static ride height. By providing a pressurized air supply to the below piston additional air chamber volume 107 the pressure in the additional air chamber volume 107 can be increased thus providing active control of the airspring 90 spring deflection curve characteristic. In addition, this feature can be used to lift individual wheels if required.

Figure 17:
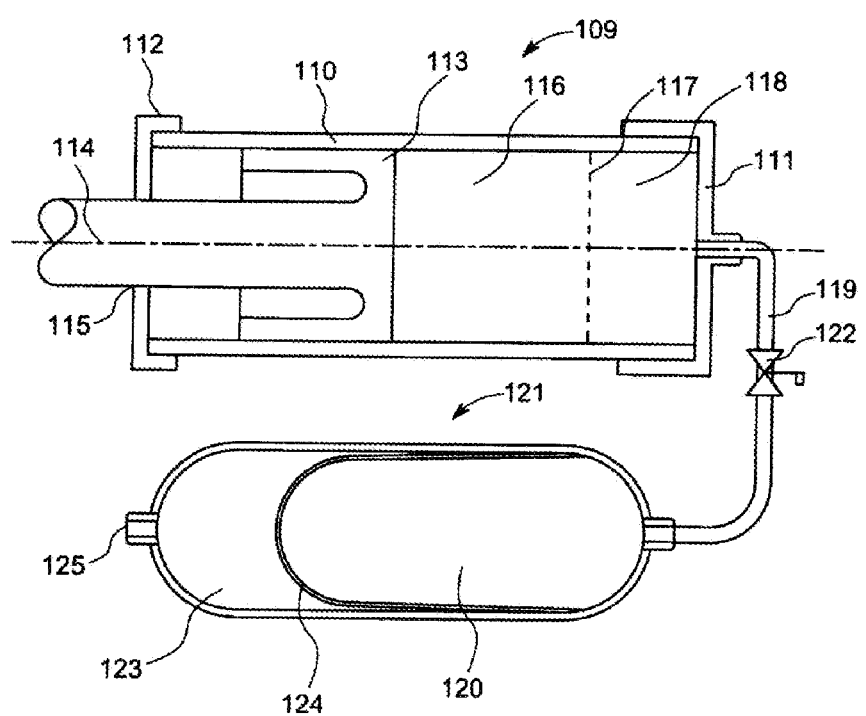
FIG. 17 is a diagrammatic sectional elevational view of another vehicle suspension gas spring according to the invention.
Figure 18:
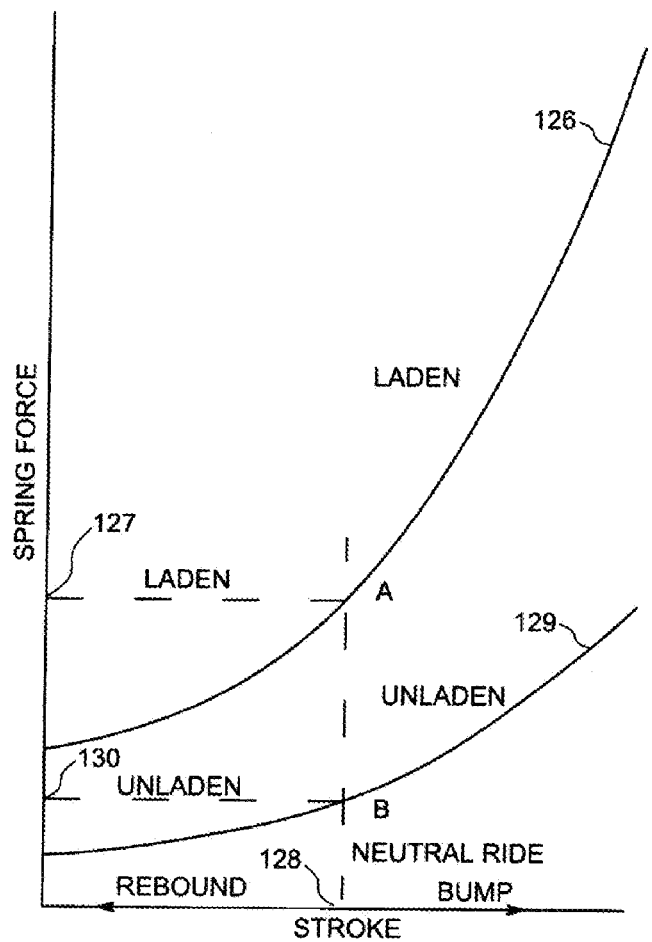
FIG. 18 is a graph which shows typical spring characteristics of the gas spring in accordance with the invention.

FIG. 17 and FIG. 18 illustrate another embodiment of a vehicle suspension gas spring 109 in accordance with the invention. FIG. 17 is a diagrammatic sectional view of the gas spring 109. The gas spring 109 comprises a cylinder 110 which is closed at both ends by a cylinder head 111 at one end and an end cap 112 at the other end. Mounted within a bore of the cylinder 110 is a piston 113 which is free to slide within the cylinder 110 and forming a gas tight seal between the cylinder 110 and the piston 113. The piston 113 is attached to a piston rod 114 which may form part of the piston 113 or be attached by various means such as a threaded end of the piston rod 114 or a bolted flange end or any other means of securing the piston rod 114 to the piston 113. The end cap 112 has a suitable aperture 115 to allow the piston rod 114 to pass through. This aperture 115 is fitted with suitable seals and a sliding bearing or bearings (not shown) to support and seal the piston rod 114.

Swept volume 116 is the volume swept by the piston 113 from the bottom of its stroke adjacent to the end cap 112 and the other extreme of its stroke indicated by the dotted line 117, indicating top dead center for the piston 113, adjacent but spaced-apart from the cylinder head 111. The free volume above the piston 113 at the extreme of its stroke, that is above the dotted line 117, is the clearance volume 118. A first gas chamber within the cylinder 110 is formed by the swept volume 116 and the clearance volume 118.

The clearance volume portion 118 of the first gas chamber is connected by a pipe 119 or any other suitable means to a second gas chamber 120 contained within an associated accumulator 121. The connection formed by the pipe 119 between the clearance volume and the second gas chamber 120 may be cut off by a stop valve 122 mounted in the pipe 119. The accumulator 121 comprises the second gas chamber 120 and a hydraulic fluid chamber 123 divided by an elastomeric bladder 124.

When the gas spring 109 is charged to a pressure required to have a desired neutral ride height in the laden condition a certain pressure "A" is required in the swept volume 118 at the neutral point (see FIG. 18). When the vehicle is unladen the required pressure at the neutral ride height is a lower pressure "B". To charge the cylinder 110 to the lower pressure "B" in the unladen condition the valve 122 is opened and gas is released from the first gas chamber 116, 118 within the cylinder 110 into the second gas chamber 120 of the accumulator 121 until the accumulator 121 is filled to capacity with gas, including the volume of the second gas chamber 120 plus the volume of the hydraulic fluid chamber 123 by expansion of the bladder 124. The volumes 116, 120, and 123 are so designed that the resultant gas pressure is equal to the required unladen pressure "B". When the system has settled at pressure "B" the valve 122 is closed.

When it is required to revert to the higher pressure "A" the valve 122 is opened and pressurized hydraulic fluid is admitted through a hydraulic fluid inlet 125 of the accumulator 121 into the hydraulic fluid chamber 123 and the bladder 124 is collapsed, forcing the gas in the second gas chamber 120 back into the first gas chamber (volumes 116 and 118). The valve 122 is closed and the gas spring 109 is now charged to the required higher pressure "A".

Referring now to FIG. 18, the principle and operation of the invention is explained. The curve 126 depicts the spring characteristic when the gas spring 109 is charged to the high pressure "A" that gives a suspension force to match the requirement of the suspension in the laden condition depicted by the point 127 on the graph in FIG. 18 corresponding to the neutral ride position depicted by point 128 on the curve. When the gas has been expelled from the gas spring 109 the spring characteristic is depicted by curve 129 in FIG. 18. The unladen weight 130 corresponds to the same neutral ride point 128 as in the laden condition. It can be seen from the graph that if the mechanism of the invention had not been used, the suspension would bottom out in rebound and the vehicle would have no effective suspension.

Figure 19:
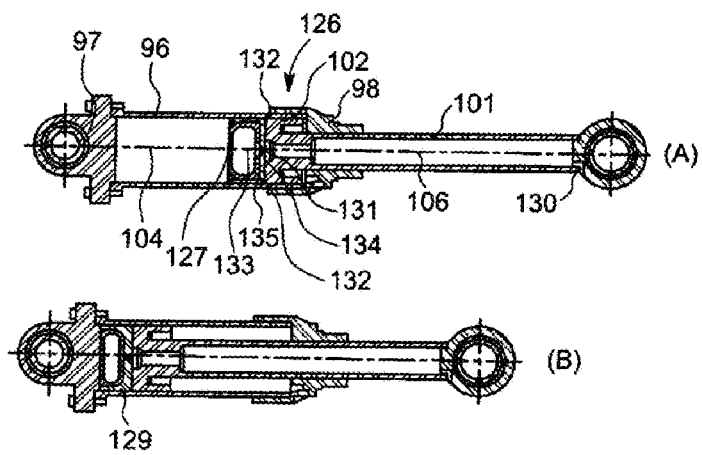
FIG. 19 is another embodiment of the invention wherein a sealing arrangement using a bladder is shown.

In FIG. 19, there is shown another embodiment of the invention comprising a bladder sealing system. There is shown an elevation section of a strut 126 in accordance with the invention. In this embodiment a cylinder 96 broadly as previously described with a piston 102 attached to a piston rod 101 as before mentioned. In the upper drawing "A" the strut is shown at full rebound position and in lower drawing "B" the strut is shown at the maximum compression full bump position. A gas charging port 130 is located as convenient to charge the strut through the piston hollow rod 101—in contrast to other embodiments wherein the gas is charged through a port in the cylinder head 97.

There is an aperture 131 in the piston crown 132 which provides a communication between the volume 106 in the piston rod 101 and the volume 133 of the bladder 127. The bladder 127 shown in the uninflated condition has a filling aperture 134 which is sealingly attached to the piston aperture 131 so as to allow gas to pass between the volume 106 and the bladder volume 133. If desired suitable damping devices may be fitted in the aperture 131/134.

When the strut at full extension is charged the bladder 127 expands to the volume 104 and assumes the configuration 128 shown in broken line. This is the normal configuration of the bladder when the strut is charged at full rebound. Note that the bladder material is not subjected to the full force of the pressure as it is fully contained by the wall of cylinder 96 and the cylinder head 97. The bladder may be made from silicone or any other suitable material. In drawing "B" the bladder 127 is shown in the maximum compression configuration 129.

To discourage extrusion of the bladder between the piston 102 and the wall of cylinder 96 the extreme edge lip 135 of the piston crown 132 may be feathered to a thin profile such that the pressure in chamber volume 104 pushes the piston crown 132 lip 135 tightly against the wall of cylinder 96 thus preventing extrusion.

The bladder 127 may also be so configured with a sufficient wall thickness so as to discourage extrusion of said bladder 127. The bladder 127 may be so designed such that the final bladder configuration 129 at full compression is the same as configuration 127 at zero pressure. The tensile loads within the bladder configuration 128 with suitable design of the bladder wall thickness and configuration will tend to encourage shrinkage of the bladder as the piston moves towards the cylinder head 97 thus discouraging extrusion of the bladder wall between the piston 102 and the cylinder wall 96.

Figure 20:
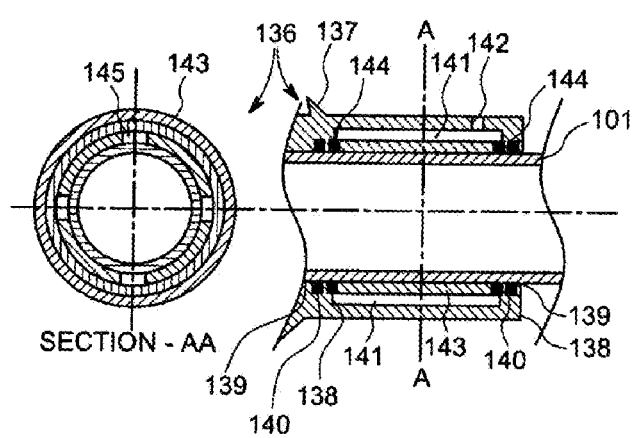
FIG. 20 are detail sectional views illustrating another embodiment of the invention which shows a clamping device to lock the suspension in any desired position.

It is sometimes required for various operational reasons to lock a vehicle suspension in various positions. One example of such a locking device is explained in another embodiment of the invention shown in FIG. 20. In this embodiment of the invention there is shown a locking device 136 comprising a housing 137 which forms a part of or is fixedly attached to the end cap 98 of FIG. 18. The housing 137 has end walls 138 which have apertures 139 through which the piston rod 101 is a sliding fit. The apertures 139 are sealed to contain the internal pressure by seals 140. The housing 137 has an internal cavity 141 to which pressurised air is admitted through the aperture 142. The aperture 142 is fitted with a control valve—not shown—that enables air to be trapped in or released from the chamber 141 as required.

Within the chamber 141 there is a collar 143 which is a sliding fit on the piston rod 101. At the ends of the collar 143 there are seals 144 to prevent leakage of high-pressure air around the ends of the collar 143.

Turning now to the section view A-A it can be seen that the sleeve 143 comprises four segments joined by four elastomeric elements 145 securely bonded to the four segments of the collar 143 in such a way as to allow deflection of the collar 143 so as to securely clamp the piston rod 101 when chamber 141 is pressurised. When pressure in chamber 141 is released by opening the control valve the rebound resilience of the elastomeric elements 145 releases the locking grip on the of collar 143 on the piston rod 101.

It will be appreciated that the above-described embodiment is only one of many possible configurations possible within the intent of the invention—for example collar could have machined slots thinning the wall so as to make it flexible or other means within the scope of the invention.

The terms "comprise" and "include", and any variations thereof required for grammatical reasons, as used herein are to be considered as interchangeable and accorded the widest possible interpretation.

While this invention has been described as having an exemplary design the present invention may be further modified within the spirit of this disclosure. Modifications and alterations may occur to others upon reading and understanding the preceding descriptions. This disclosure is therefore intended to cover any variations, uses or adaptations of the invention using its general principles, within the scope of the appended claims.

REFERENCES CITED

Fongue, W. A., Air Spring Air Damper: "Modelling and Dynamic Performance in Case of Small Excitations." SAE Int. J. Passenger. Cars—Mech. Syst. 6(2):2013.

Pelz, P., "Beschreibung von pneumatischen Dampfungssystemen mit dimensionsanalytischen Methoden" VDI-Bericht Nr. 2003, VDI-Verlag (2007).

W. A. Fongue, P. F. Pelz, J. Kieserling, "The Dynamic Performance of Air Spring Air Damping."

Huayan Pu, Xin Luo, Xuedong Chenn, "Systems by means of small Excitations." PROCEEDINGS OF ISMA2012-USD2012.

Modeling and Analysis of Dual-Chamber Pneumatic Spring with Adjustable Damping for Precision Vibration Isolation".

Quaglia, G., "Air Suspension Dimensionless Analysis and Design Procedure" Vehicle System Dynamics 2001 Vol 35 No 6.

Bachrach, B. I., "Analysis of a Damped Pneumatic Spring". Journal of Sound and Vibration, 1983, 86 (2).

Asami T., Theoretical and Experimental Analysis of the Nonlinear Characteristics of an Air Spring with an Orifice.

Asami T., An Approximate Formula to Calculate the Restoring and Damping Forces of an Air Spring with a Small Pipe.

Holtz, M. W., Modelling and design of a novel air-spring for a suspension seat.

Jeung-Hoon Lee, Kwang-Joon Kimb, A method of transmissibility design for dual-chamber pneumatic vibration isolator.

Toyofuku, K., Study on dynamic characteristic analysis of air spring with auxiliary chamber.

Docquier, N., Multiphysic modelling of railway vehicles equipped with pneumatic suspensions.

H. Sayyaadi, New Dynamics Model for Rail Vehicles and Optimizing Air Suspension Parameters Using GA.

What is claimed is:

1. A vehicle suspension gas spring for mounting between a vehicle chassis and a vehicle wheel suspension member comprising:
   a cylinder closed at one end;
   a piston assembly slidably mounted within the cylinder and sealingly engaging with a bore of the cylinder to form a gastight seal between the piston and the cylinder bore;
   a piston rod attached to the piston and projecting outwardly of the cylinder, the piston rod passing through and being slidably mounted in an end cover of the cylinder;
   connector means for attachment of the cylinder to one of the vehicle chassis and the vehicle suspension member and for attachment of the piston rod to the other of the vehicle chassis and the vehicle suspension member;
   a gas working medium within the cylinder; and
   a first gas chamber formed by the swept volume of the cylinder and an associated second gas chamber communicating with the first gas chamber through a gas passageway which restricts the flow of gas therebetween;
   wherein:
      the piston and the piston rod each have a hollow interior and the second gas chamber is formed by the hollow interior of the piston and the hollow interior of the piston rod;
      a valve is mounted between the hollow interior of the piston and the hollow interior of the piston rod, the valve being operable to either connect or isolate the hollow interior of the piston and the hollow interior of the piston rod to vary the volume of the second gas chamber.

2. The vehicle suspension gas spring as claimed in claim 1, wherein the second gas chamber is filled with an open cell foam material which may or may not be divided into a multiplicity of air passages.

3. The vehicle suspension gas spring as claimed in claim 1, wherein the piston has a cover plate with one or more apertures to provide damping.

4. The vehicle suspension gas spring as claimed in claim 3, wherein the piston cover plate has a damping pipe or pipes fitted within the second gas chamber fluidly communicating between the second gas chamber and the first gas chamber.

5. The vehicle suspension gas spring as claimed in claim 1, wherein the hollow interior of the piston rod is in communication with the hollow interior of the piston by means of one or more apertures in a cover plate separating the hollow interior of the piston from the hollow interior of the piston rod.

6. The vehicle suspension gas spring as claimed in claim 5, wherein one or more of the apertures have a damper pipe or pipes attached on the piston rod interior side permitting fluid communication between the hollow interior of the piston and the hollow interior of the piston rod.

7. The vehicle suspension gas spring as claimed in claim 1, wherein the piston rod chamber volume is filled with an open cell foam material which may or may not be divided into a multiplicity of air passages.

8. The vehicle suspension gas spring as claimed in claim 1, wherein an additional below piston chamber formed by the piston base, the cylinder wall and the piston rod bearing plate is suitably sealed so as to be airtight to allow a build-up of pressure as the piston approaches rebound position.

9. The vehicle suspension gas spring as claimed in claim 8, wherein means are provided for delivering pressurised air to the first gas chamber and also a means to deliver pressurised air into the additional below piston chamber.

10. The vehicle suspension gas spring as claimed in claim 1, wherein an elastomeric sealing membrane is sealingly attached to the cylinder at the cylinder head end and is sealingly attached to the piston at the other end such that at maximum bump/jounce position of the piston the membrane is at its minimum extension and extends elastically when the piston moves to the maximum extension at full rebound position.

11. The vehicle suspension gas spring as claimed in claim 1, wherein there is a stepper motor or similar actuator located in the piston rod and operably connected to a cover plate movably mounted at the top of the piston and with one or more apertures so designed as to block or open corresponding apertures in the piston cover in such a way as to provide a variety of combinations of apertures fluidly communicating between the second gas chamber within the piston and the first gas chamber so as to actively vary the levels of damping.

12. The vehicle suspension gas spring as claimed in claim 1, wherein a suitable heat transfer device is installed in the second gas chamber and communicating with the exterior so as to rapidly and advantageously transfer and dissipate heat built up in the second gas chamber to the exterior atmosphere.

13. The vehicle suspension gas spring as claimed in claim 1, wherein means is provided to permit air to be added to or expelled from the first gas chamber.

14. The vehicle suspension gas spring as claimed in claim 1, wherein there is an air actuated locking device so designed as to grip the piston rod so as to lock the gas strut in any desired position by means of an air actuated deformable collar through which the piston rod can move freely but which is deformed so as to grip the piston rod when subjected to air pressure.

15. A vehicle suspension gas spring for mounting between a vehicle chassis and a vehicle wheel suspension member comprising:
   a cylinder closed at one end;
   a piston assembly slidably mounted within the cylinder and sealingly engaging with a bore of the cylinder to form a gastight seal between the piston and the cylinder bore;
   a piston rod attached to the piston and projecting outwardly of the cylinder, the piston rod passing through and being slidably mounted in an end cover of the cylinder;
   connector means for attachment of the cylinder to one of the vehicle chassis and the vehicle suspension member and for attachment of the piston rod to the other of the vehicle chassis and the vehicle suspension member;
   a gas working medium within the cylinder; and
   a first gas chamber formed by the swept volume of the cylinder and an associated second gas chamber communicating with the first gas chamber through a gas passageway which restricts the flow of gas therebetween;
   wherein:
      the second gas chamber is filled with an open cell foam material which may or may not be divided into a multiplicity of air passages.

16. A vehicle suspension gas spring for mounting between a vehicle chassis and a vehicle wheel suspension member comprising:

a cylinder closed at one end;
a piston assembly slidably mounted within the cylinder and sealingly engaging with a bore of the cylinder to form a gastight seal between the piston and the cylinder bore;
a piston rod attached to the piston and projecting outwardly of the cylinder, the piston rod passing through and being slidably mounted in an end cover of the cylinder;
connector means for attachment of the cylinder to one of the vehicle chassis and the vehicle suspension member and for attachment of the piston rod to the other of the vehicle chassis and the vehicle suspension member;
a gas working medium within the cylinder; and
a first gas chamber formed by the swept volume of the cylinder and an associated second gas chamber communicating with the first gas chamber through a gas passageway which restricts the flow of gas therebetween;
wherein:
the piston has a hollow interior forming the second gas chamber and the piston has a cover plate with one or more apertures to provide damping.

17. A vehicle suspension gas spring for mounting between a vehicle chassis and a vehicle wheel suspension member comprising:
a cylinder closed at one end;
a piston assembly slidably mounted within the cylinder and sealingly engaging with a bore of the cylinder to form a gastight seal between the piston and the cylinder bore;
a piston rod attached to the piston and projecting outwardly of the cylinder, the piston rod passing through and being slidably mounted in an end cover of the cylinder;
connector means for attachment of the cylinder to one of the vehicle chassis and the vehicle suspension member and for attachment of the piston rod to the other of the vehicle chassis and the vehicle suspension member;
a gas working medium within the cylinder; and
a first gas chamber formed by the swept volume of the cylinder and an associated second gas chamber communicating with the first gas chamber through a gas passageway which restricts the flow of gas therebetween;
wherein:
an additional below piston chamber formed by the piston base, the cylinder wall and the piston rod bearing plate is suitably sealed so as to be airtight to allow a build-up of pressure as the piston approaches rebound position.

18. A vehicle suspension gas spring for mounting between a vehicle chassis and a vehicle wheel suspension member comprising:
a cylinder closed at one end;
a piston assembly slidably mounted within the cylinder and sealingly engaging with a bore of the cylinder to form a gastight seal between the piston and the cylinder bore;
a piston rod attached to the piston and projecting outwardly of the cylinder, the piston rod passing through and being slidably mounted in an end cover of the cylinder;
connector means for attachment of the cylinder to one of the vehicle chassis and the vehicle suspension member and for attachment of the piston rod to the other of the vehicle chassis and the vehicle suspension member;
a gas working medium within the cylinder; and
a first gas chamber formed by the swept volume of the cylinder and an associated second gas chamber communicating with the first gas chamber through a gas passageway which restricts the flow of gas therebetween;
wherein:
an elastomeric sealing membrane is sealingly attached to the cylinder at the cylinder head end and is sealingly attached to the piston at the other end such that at maximum bump/jounce position of the piston the membrane is at its minimum extension and extends elastically when the piston moves to the maximum extension at full rebound position.

* * * * *